United States Patent
Rawlyk

(10) Patent No.: US 12,286,311 B2
(45) Date of Patent: Apr. 29, 2025

(54) LINEAR TRANSPORT SYSTEM WITH OBJECT TRANSFER

(71) Applicant: Beckhoff Automation GmbH, Verl (DE)

(72) Inventor: Robert Ian Rawlyk, Rheda Wiedenbrück (DE)

(73) Assignee: Beckhoff Automation GmbH, Verl (DE)

(*) Notice: Subject to any disclaimer, the term of this patent is extended or adjusted under 35 U.S.C. 154(b) by 90 days.

(21) Appl. No.: 18/309,264

(22) Filed: Apr. 28, 2023

(65) Prior Publication Data
US 2023/0331496 A1    Oct. 19, 2023

Related U.S. Application Data

(63) Continuation of application No. PCT/EP2021/082598, filed on Nov. 23, 2021.

(30) Foreign Application Priority Data

Nov. 24, 2020   (DE) .................. 10 2020 131 035.8

(51) Int. Cl.
*B65G 47/52* (2006.01)
*B65G 43/10* (2006.01)
(Continued)

(52) U.S. Cl.
CPC ............ *B65G 47/52* (2013.01); *B65G 43/10* (2013.01); *B65G 47/92* (2013.01); *B65G 54/02* (2013.01)

(58) Field of Classification Search
CPC ........ B65G 47/92; B65G 47/52; B65G 54/02; B65G 43/10
(Continued)

(56) References Cited

U.S. PATENT DOCUMENTS 10,139,351 B2   11/2018   Piana et al.
10,622,921 B2    4/2020   Weber et al.
(Continued)

FOREIGN PATENT DOCUMENTS

DE         20305988 U1   7/2003
DE     102005055616 A1   7/2007
(Continued)

OTHER PUBLICATIONS

International Search Report and Written Opinion dated Feb. 25, 2022 in connection with International patent application No. PCT/EP2021/082598, 18 pages including English translation.
(Continued)

*Primary Examiner* — James R Bidwell
(74) *Attorney, Agent, or Firm* — Dorsey & Whitney LLP

(57) ABSTRACT

A method for transferring an object from a first rotor to a second rotor in a linear transport system is provided in a transfer region between a first drive unit and a second drive unit. The rotors move along the drive units due to a magnetic field generated by respective coil units, and the object is initially attached to the first rotor with the aid of a first connection. The method includes synchronizing movements of the first and second rotor so that the first and second rotor move with coordinated trajectories in the transfer region, forming a second connection between the object and the second rotor in the transfer region, and releasing the first connection. The first connection is created with the aid of a first retaining element, and the second connection is created with the aid of a second retaining element.

18 Claims, 18 Drawing Sheets

(51) Int. Cl.
*B65G 47/92* (2006.01)
*B65G 54/02* (2006.01)

(58) Field of Classification Search
USPC .......................................................... 198/805
See application file for complete search history.

(56) References Cited

U.S. PATENT DOCUMENTS

| | | | |
|---|---|---|---|
| 11,117,758 B2* | 9/2021 | Kleinikkink | ......... H02K 41/031 |
| 11,279,511 B2 | 3/2022 | Marcantoni | |
| 11,377,311 B2 | 7/2022 | Elsperger et al. | |
| 2016/0159508 A1 | 6/2016 | Jacobs et al. | |
| 2017/0343483 A1 | 11/2017 | Piana et al. | |
| 2020/0354166 A1 | 11/2020 | Abe et al. | |
| 2021/0253374 A1 | 8/2021 | Elsperger et al. | |
| 2022/0234876 A1 | 7/2022 | Raith et al. | |

FOREIGN PATENT DOCUMENTS

| | | | | |
|---|---|---|---|---|
| DE | 102011078555 A1 | | 1/2013 | |
| DE | 102014103632 A1 | | 9/2015 | |
| DE | 102014226965 A1 | | 6/2016 | |
| DE | 102018209722 A1 | | 12/2019 | |
| DE | 102018132608 A1 | | 6/2020 | |
| DE | 102018222767 A1 | * | 6/2020 | ............. B65G 47/90 |
| EP | 2889238 A1 | | 7/2015 | |
| EP | 3109998 A1 | | 12/2016 | |
| WO | 9626114 A1 | | 8/1996 | |
| WO | 2019159116 A1 | | 8/2019 | |
| WO | 2019159117 A1 | | 8/2019 | |
| WO | 2021261263 A1 | | 12/2021 | |

OTHER PUBLICATIONS

Office Action dated Jul. 23, 2021 in connection with German patent application No. 10 2020 131 035.8, 11 pages including English translation.

* cited by examiner

LINEAR TRANSPORT SYSTEM WITH OBJECT TRANSFER

CROSS-REFERENCE TO RELATED APPLICATIONS

This patent application is a continuation of International Patent Application No. PCT/EP2021/082598 filed Nov. 23, 2021, titled LINEAR TRANSFER SYSTEM WITH OBJECT TRANSFER, which claims the priority of German patent application DE 10 2020 131 035.8 filed Nov. 24, 2020, titled LINEARES TRANSPORTSYSTEM MIT OBJEKTÜBERGABE, each of which is incorporated by reference herein, in the entirety and for all purposes.

FIELD

The invention relates to a method for transferring an object from a first rotor to a second rotor in a linear transport system, to a controller of a linear transport system, and a linear transport system.

BACKGROUND

Linear transport systems in which rotors may be moved along drive units are known from the prior art. It may be provided that the drive units comprise a stator of a linear motor having drive coils and the rotors comprise a rotor of the linear motor having a permanent magnet arrangement. Such linear transport systems may be used in automation technology to move objects such as parts or components within a production system and to feed them to various processing stations, or possibly also to packaging stations. In this context, it does not always make sense to provide a completely linear course of the production system, but to achieve a separation and/or a merging of an object flow e.g. with the aid of switches. European patent application EP 3 109 998 A1 discloses a method and a long stator linear motor for transferring a rotor at a transfer position. The long stator linear motor represents a drive unit. The object is in this context permanently connected to the rotor and the rotor may be transferred from one long stator linear motor to another long stator linear motor at transfer positions. The object is thus transferred together with the rotor between the long stator linear motors.

However, the method disclosed in European patent application EP 3 109 998 A1 restricts the possibilities of how the object may be arranged at the rotors, i.e. how the rotor carries and transports the object, since the rotors must be embodied in such a way that they are each arranged with two different sides on one of the two long stator linear motors. This means that objects may only be arranged above or below the long stator linear motors.

SUMMARY

The present invention provides a method to transfer an object between two drive units while allowing a more flexible spatial arrangement of objects, rotors and drive units in a linear transport system.

According to a first aspect, the invention relates to a method for transferring an object from a first rotor to a second rotor in a linear transport system. The transfer takes place in a transfer region, wherein the transfer region is arranged between a first drive unit and a second drive unit of the linear transport system. The first drive unit comprises a first coil unit of a first linear motor. The second drive unit comprises a second coil unit of a second linear motor. The first rotor may comprise a first permanent magnet arrangement, and the second rotor may comprise a second permanent magnet arrangement. The first rotor moves along the first drive unit due to a magnetic field generated by the first coil unit, and the second rotor moves along the second drive unit due to a magnetic field generated by the second coil unit. The object is initially attached to the first rotor with the aid of a first force-fit and/or form-fit connection.

In order to transfer the object from the first rotor to the second rotor, movements of the first rotor and the second rotor are first synchronized in such a way that the first rotor and the second rotor move in the transfer region with coordinated trajectories. Subsequently or simultaneously to this synchronization, a second force-fit and/or form-fit connection is formed between the object and the second rotor in the transfer region. Subsequently or simultaneously, the first force-fit and/or form-fit connection is released. The first rotor comprises a first retaining element, wherein the first force-fit and/or form-fit connection between the first rotor and the object is generated with the aid of the first retaining element. The second rotor comprises a second retaining element, wherein the second force-fit and/or form-fit connection between the second rotor and the object is generated with the aid of the second retaining element.

This method makes it possible to transfer the object from the first rotor to the second rotor, thus providing a more flexible linear transport system. By transferring the object, the rotors may each remain on the drive unit carrying and driving them, so that a more flexible arrangement of the drive units, the rotors, the retaining elements and the object is possible overall.

The object may in this context be the part or component to be moved within a production system with the aid of the linear transport system. Furthermore, it may also be provided that the object comprises a retainer for the component or the component. Furthermore, the object may also comprise a container for a liquid.

The first drive unit may in this context be arranged in a closed path with further drive units. The second drive unit may also be arranged in a closed path with further drive units. Alternatively, the first drive unit and the second drive unit may also be part of a common closed path having further drive units.

In particular, the coordinated motion paths may comprise positions, and speeds of the first rotor and of the second rotor predetermined for each of these positions. It may also be provided that the coordinated motion paths comprise positions and speeds for the first rotor and for the second rotor at predetermined times.

According to a second aspect, the invention further comprises a linear transport system having a first rotor, a second rotor, a first drive unit, and a second drive unit, in which a transfer region is arranged between the first drive unit and the second drive unit. The first drive unit comprises a first coil unit of a first linear motor. The second drive unit comprises a second coil unit of a second linear motor. The first rotor may comprise a first permanent magnet arrangement. The second rotor may comprise a second permanent magnet arrangement. The first rotor may be moved along the first drive unit due to a magnetic field generated by the first coil unit. The second rotor may be moved along the second drive unit due to a magnetic field generated by the second coil unit. An object may be attached to a first retaining element of the first rotor with the aid of a first force-fit and/or form-fit connection, and may be attached to a second retaining element of the second rotor with the aid of a second force-fit and/or form-fit connection.

The linear transport system further comprises a controller. The controller is set up to synchronize movements of the first rotor and the second rotor in such a way that the first rotor and the second rotor move with mutually coordinated paths of movement in the transfer region, to move the first rotor and/or the second rotor in such a way that a second force-fit and/or form-fit connection is formed between the object and the second rotor in the transfer region, and to move the first rotor and/or the second rotor in such a way that the first force-fit and/or form-fit connection is released.

According to a third aspect, the invention further comprises a controller of a linear transport system, wherein the controller comprises a computing unit having a computer program executable on the computing unit. The controller is arranged to output control signals to a first drive unit and to a second drive unit, wherein at least a first rotor and a second rotor may be moved by the control signals in such a way that the method according to the invention is carried out.

EXAMPLES

In an embodiment of the method and of the linear transport system, the first retaining element is arranged in the transfer region in a first spatial partial region and the second retaining element is arranged in the transfer region in a second spatial partial region. The first spatial partial region is thereby outside the second spatial partial region.

In other words, the first retaining element and the second retaining element are arranged in such a way that when the first rotor and the second rotor are moved in the transfer region, the first retaining element and the second retaining element cannot collide with each other. The retaining elements may thus be embodied in such a way that they do not touch each other or that no contact may occur between them. In this way, it may be achieved that trouble-free operation of the linear transport system is possible even at higher speeds of the rotors. If the first retaining element and/or the second retaining element are movable in themselves or have movable parts, it may be provided that the first spatial partial region comprises all possible movement states of the first retaining element and the second spatial partial region comprises all possible movement states of the second retaining element.

In an embodiment of the method and of the linear transport system, the first retaining element comprises at least a first magnet and the second retaining element comprises at least a second magnet. The object comprises, at least in part, a ferromagnetic material.

Thus, at least part of the first force-fit and/or form-fit connection is embodied as a force-fit connection between the first magnet and the ferromagnetic material of the object, while at least part of the second force-fit and/or form-fit connection is embodied as a force-fit connection between the second magnet and the ferromagnetic material of the object. In particular, it may be provided that a force embodied between the first magnet (or the plurality of first magnets) and the second magnet (or the plurality of second magnets), respectively, is such that the object may be held against a weight force of the object.

Likewise, an embodiment may be provided in which the first force-fit and/or form-fit connection comprises exclusively the force-fit connection between the first magnet (or the plurality of first magnets) and the object, and in which the second force-fit and/or form-fit connection comprises exclusively the force-fit connection between the second magnet (or the plurality of second magnets) and the object.

In an embodiment of the method and of the linear transport system, the first retaining element comprises at least a first circular arc-shaped receptacle having a first rubber lip. The second retaining element comprises at least a second circular arc-shaped receptacle having a second rubber lip. The object comprises at least a circular object section, wherein the first circular arc-shaped receptacle and the second circular arc-shaped receptacle each comprise an interior angle larger than 180 degrees.

The fact that the first circular-arc-shaped receptacle and the second circular-arc-shaped receptacle each comprise an internal angle of more than 180 degrees means that the round object section of the object may be held in a force-fit and form-fit manner within the first circular-arc-shaped receptacle and held in a force-fit and form-fit manner in the second circular-arc-shaped receptacle. In particular, the internal angle may be a maximum of 200 degrees. If the object is now moved relatively in the direction of the first or second circular-arc-shaped receptacle, the first or second rubber lip may be compressed in such a way that the object is received and held in the first or second circular-arc-shaped receptacle.

In this embodiment, an additional fixation with at least one first magnet on the first retaining element and/or at least one second magnet on the second retaining element is in principle also possible. This may be embodied analogously to the embodiment described above.

In an embodiment of the method, the release of the first force-fit and/or form-fit connection is carried out by moving the second rotor faster or slower than the first rotor.

This means that the transfer of the object from the first rotor to the second rotor may be controlled with the aid of suitable control of the first drive unit or the second drive unit and the resulting magnetic forces acting on the first permanent magnet arrangement of the first rotor or the second permanent magnet arrangement of the second rotor. This is possible in particular with a suitable arrangement of the first and second retaining device, respectively.

In an embodiment of the controller and the linear transport system, the controller is arranged to move the second rotor faster or slower than the first rotor to achieve the release of the first force-fit and/or form-fit connection.

In an embodiment of the method, the second retaining element is arranged at least partially behind the object in the transfer region relative to a direction of travel of the first rotor and/or the second rotor. The second rotor is moved faster than the first rotor. In an embodiment of the linear transport system, the second retaining element is arranged at least partially behind the object in the transfer region with respect to a direction of travel of the first rotor and/or the second rotor. The second rotor may be moved faster than the first rotor.

Due to the fact that the second retaining device is arranged at least partially behind the object, in the event of a movement of the second rotor that is faster than a movement of the first rotor, the object may be released from the first force-fit and/or form-fit connection by the second retaining device arranged behind the object. The object is thus carried along by the second retaining device after the second force-fit and/or form-fit connection has been formed and is thus transferred from the first rotor to the second rotor. At least in a part of the transfer region, the second rotor moves faster than the first rotor. It may be provided that the movements of the two rotors are synchronized in such a way that the first rotor and the second rotor move at a constant speed throughout the transfer region, with the second rotor moving faster than the first rotor. Alternatively, the first and/or second rotor may be braked or accelerated.

In an embodiment of the method, the second retaining element is arranged at least partially in front of the object in the transfer region relative to a direction of travel of the first rotor and/or the second rotor. The second rotor is moved more slowly than the first rotor. In an embodiment of the linear transport system, the second retaining element is arranged at least partially in front of the object in the transfer region with respect to a direction of travel of the first rotor and/or the second rotor. The second rotor may be moved more slowly than the first rotor.

Due to the fact that the second retaining device is arranged at least partially in front of the object, in the event of a movement of the second rotor that is slower than a movement of the first rotor, the object may be released from the first force-fit and/or form-fit connection by the second retaining device arranged in front of the object. The object is thus decelerated by the second retaining device after the second force-fit and/or form-fit connection has been formed and is thus transferred from the first rotor to the second rotor. At least in a part of the transfer region, the second rotor moves more slowly than the first rotor. It may be provided that the movements of the two rotors are synchronized in such a way that the first rotor and the second rotor move at a constant speed throughout the transfer region, with the second rotor moving slower than the first rotor. Alternatively, the first and/or second rotor may be braked or accelerated.

In an embodiment of the method and of the linear transport system, the first retaining element in the transfer region is arranged identically to the second retaining element with respect to a direction of travel of the first rotor and/or the second rotor. This is possible in particular if the first retaining element in the transfer region is arranged in a first spatial partial region and the second retaining element in the transfer region is arranged in a second spatial partial region, the first spatial partial region being outside of the second spatial partial region.

In such an arrangement, it may be provided that the first retaining device and the second retaining device are in principle identical, if necessary mirror-inverted. This allows for a simpler linear transport system with as few different components as possible.

In an embodiment of the method, the first retaining element is moved at least partially in relation to a direction of travel of the first rotor and/or the second rotor in front of and/or behind and/or in the transfer region with the aid of an eccentric and a control element acting on the eccentric and fixed to the first or the second drive unit. In an embodiment of the method, the second retaining element is at least partially moved with respect to a direction of travel of the first rotor and/or the second rotor in front of and/or behind and/or in the transfer region with the aid of an eccentric and a control element acting on the eccentric and fixed to the first or the second drive unit.

In an embodiment of the linear transport system, the first retaining element has an eccentric. A control element is fixed to the first or the second drive unit, wherein the first retaining element may be moved at least partially with the aid of the eccentric and the control element in front of and/or behind and/or in the transfer region. In an embodiment of the linear transport system, the second retaining element comprises an eccentric. A control element is fixed to the first or the second drive unit, wherein with the aid of the eccentric and the control element in front of and/or behind and/or in the transfer region the second retaining element may be moved at least partially.

The eccentric and the control element may therefore move the first retaining element and/or the second retaining element at least partially. In particular, it may be provided that with the aid of the eccentric and the control element the first retaining device and/or the second retaining device are moved in the transfer region in such a way that the first retaining device and/or the second retaining device are arranged in the transfer region in front of or behind the object, while the first retaining device and/or the second retaining device are otherwise arranged differently.

In an embodiment of the method, the first retaining element and/or the second retaining element comprises a gripper, wherein the gripper is moved with the aid of the eccentric and the control element acting on the eccentric.

In an embodiment of the linear transport system, the first retaining element and/or the second retaining element comprises a gripper, wherein the gripper may be moved with the aid of the eccentric and the control element acting on the eccentric.

Thus, with the aid of the eccentric and the control element, a gripper of the first retaining device and/or a gripper of the second retaining device may be moved. This also allows for a transfer of the object from the first rotor to the second rotor triggered by the synchronized movement of the two rotors, in particular when the gripper of the second retaining device is closed and the gripper of the first retaining device is opened at the same time or afterwards.

The gripper of the first retaining device may additionally comprise at least one first magnet and the gripper of the second retaining device may comprise at least one second magnet, wherein the object at least partially comprises a ferromagnetic material.

In an embodiment of the method, the first retaining element and/or the second retaining element is embodied to be controllable. Power and/or data for controlling the first retaining element and/or the second retaining element are transmitted to the first rotor and the second rotor, respectively.

In an embodiment of the linear transport system, the first retaining element and/or the second retaining element is embodied to be controllable, wherein power and/or data for controlling the first retaining element and/or the second retaining element may be transmitted to the first rotor and the second rotor, respectively.

The first retaining element or the second retaining element may comprise, among other things, a gripper, a vacuum lifter and/or an electromagnet. This embodiment also allows for a transfer of the object from the first rotor to the second rotor. It may be provided that the control of the first retaining device and of the second retaining device, respectively, is synchronized relative to positions of the first rotor and the second rotor, respectively. It may be provided that the power and/or the data are transmitted with the aid of the first drive element and the second drive element, respectively, and that the transmission of power and/or data takes place on the basis of a position of the rotors determined with the aid of position sensors. Embodiments are also conceivable in which only power is transmitted and the control takes place in such a way that a movement of the first retaining element and/or second retaining element takes place on the basis of the transmitted power. Furthermore, embodiments are conceivable in which only data is transmitted and power is supplied to the first retaining element and/or second retaining element, e.g. with the aid of batteries.

In an embodiment of the linear transport system, the latter comprises the controller according to the invention.

BRIEF DESCRIPTION OF THE DRAWINGS

The invention will be discussed in more detail below by embodiment examples and with reference to figures. Here, in a schematic illustration in each case.

Figure 1:
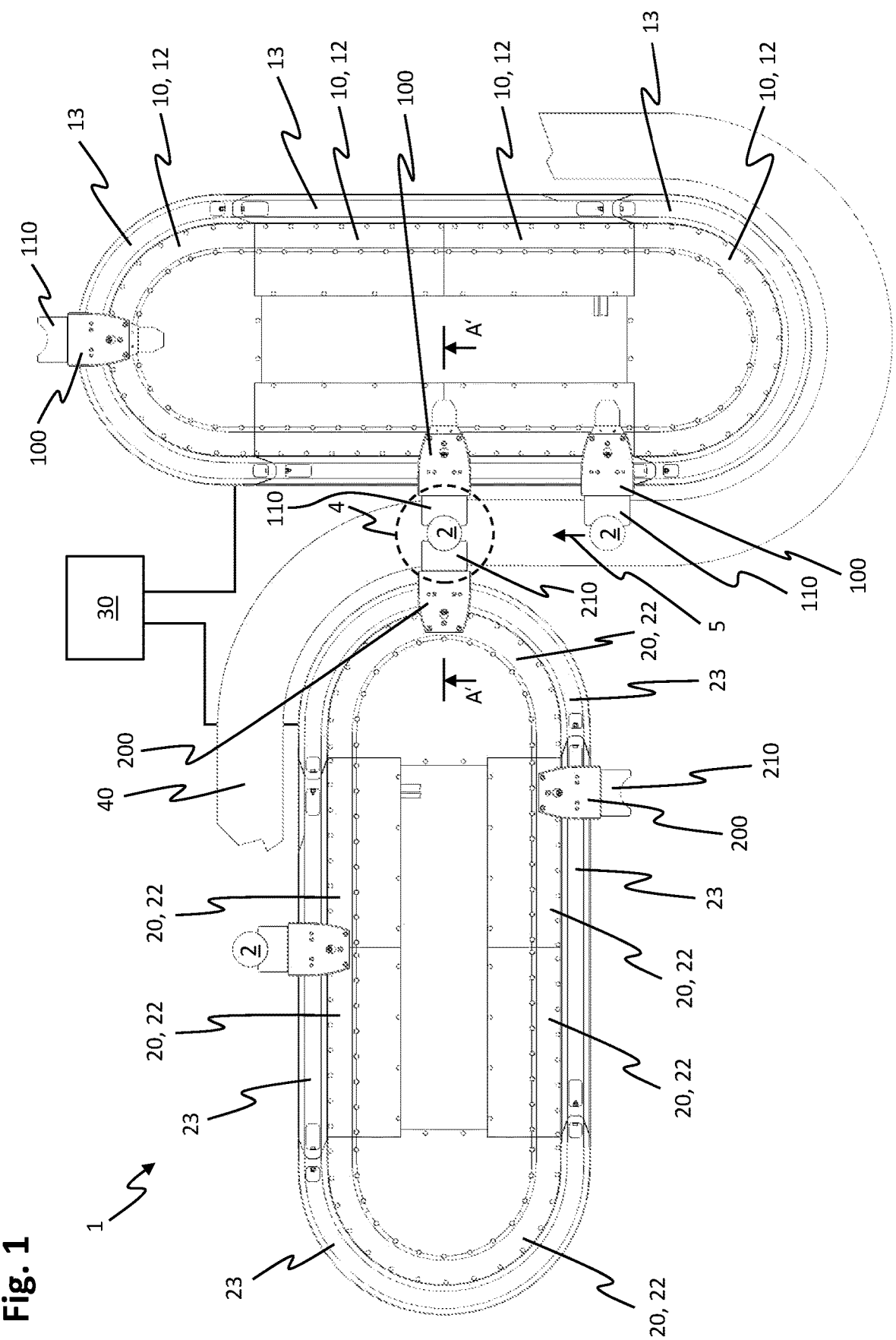
FIG. 1 shows a top view of a linear transport system.

In the figure descriptions, identical elements are provided with identical reference numerals, wherein no further explanations of individual reference numerals are provided, as the case may be. The meaning of these reference numerals is derived from the remaining descriptive text of the other figures.

DETAILED DESCRIPTION

FIG. 1 shows a top view of a linear transport system 1. The linear transport system comprises at least one first rotor 100 and at least one second rotor 200, with three first rotors 100 and three second rotors 200 being shown as examples in FIG. 1. However, a different number of first rotors 100 or second rotors 200 may be provided. In particular, the number of first rotors 100 may also be different from the number of second rotors 200. The linear transport system 1 further comprises at least one first drive unit 10 and at least one second drive unit 20, wherein six first drive units 10 and six second drive units 20 are shown in FIG. 1, respectively. However, a different number of first drive units 10 and second drive units 20 may be provided. In particular, the number of first drive units 10 may also differ from the number of second drive units 20. A transfer region 4 is arranged between the first drive unit 10 and the second drive unit 20, the transfer region 4 being indicated with the aid of a dashed line.

The first drive units 10 each have a first coil unit of a first linear motor 12. The second drive units 20 each comprise a second coil unit of a second linear motor 22. The first rotors 100 each comprise a first permanent magnet arrangement. The second rotors 200 comprise a second permanent magnet arrangement. The first rotors 100 may be moved along the first drive units 10 due to a magnetic field generated by the first coil units. The second rotors 200 may be moved along the second drive units 20 due to a magnetic field generated by the second coil units.

The first rotors 100 each comprise a first retaining element 110. An object 2 is attached to two first rotors 110 each with the aid of a first force-fit and/or form-fit connection to the first retaining elements 110 of said first rotors 100. Furthermore, it is in principle also possible to attach the objects 2 to the second retaining elements 210 of the second rotors 200 with the aid of a second force-fit and/or form-fit connection, as shown in FIG. 1 for a second rotor 200. The linear transport system 1 further comprises a controller 30, wherein the controller 30 is arranged to control and in particular synchronize movements of the first rotors 100 and the second rotors 200. A plurality of controllers 30 could also be provided, which are arranged to control and in particular to synchronize movements of the first rotors 100 and the second rotors 200.

Figure 2:
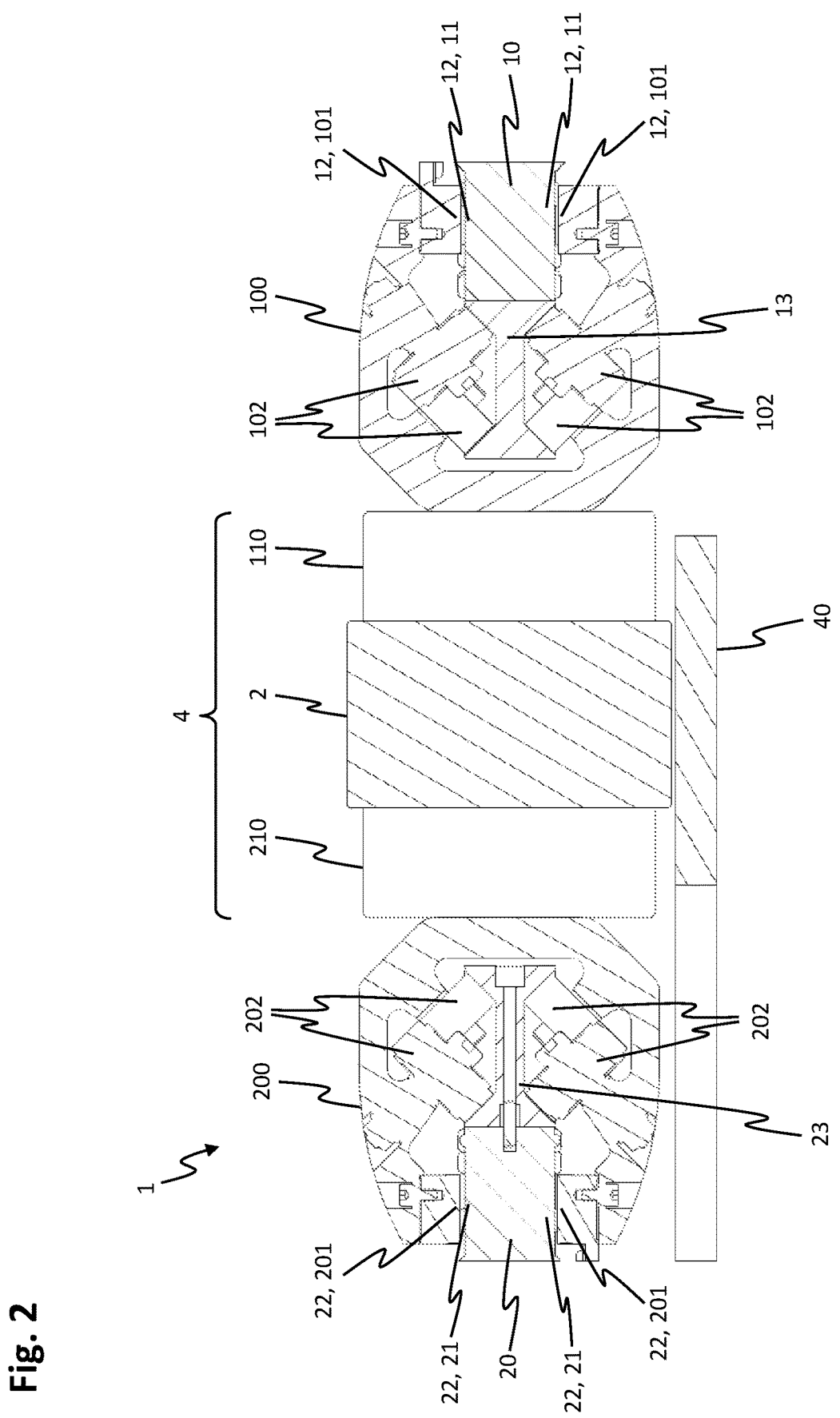
FIG. 2 shows a cross-section through the linear transport system of FIG. 1.

FIG. 2 shows a cross-section through the linear transport system 1 of FIG. 1 at the line of intersection marked me A'-A' through the transfer region 4. The first rotor 100 comprises first rollers 102 that may roll on a first rail 13. The second rotor 200 comprises second rollers 202 that may roll on a second rail 23. In the first rotor 100, the first permanent magnet arrangement 101 is arranged. In the first drive unit 10, the first coil unit 11 is arranged. The first coil unit 11 and the first permanent magnet arrangement 101 form the first linear motor 12. The first rotor 100 may be moved along the first rail 13 due to a magnetic force generated by the first coil unit 11 and acting on the first permanent magnet arrangement 101. In the second rotor 200, the second permanent magnet arrangement 201 is arranged.

In the second drive unit 20, the second coil unit 21 is arranged. The second coil unit 21 and the second permanent magnet arrangement 201 form the second linear motor 22. The second rotor 200 may be moved along the second rail 23 due to a magnetic force generated by the second coil unit 21 and acting on the second permanent magnet arrangement 201. A control of the first coil unit 11 and of the second coil unit 21 may thereby be carried out with the aid of the controller 30. In particular, the controller 30 may be set up to output a signal to the first drive unit 10 and the second drive unit 20, with the first coil unit 11 being energized by the first drive unit 10 on the basis of the signal and the second coil unit 21 being energized by the second drive unit 20 on the basis of the signal.

Alternatively, instead of the first permanent magnet arrangement 101, the first rotor 100 may comprise another element that may interact with the first coil unit 11. Similarly, instead of the second permanent magnet arrangement 201, the second rotor 200 may have another element that may interact with the second coil arrangement 21.

In order to transfer the objects 2 from the first rotors 100 to the second rotors 200, the following procedure may be carried out. First, movements of the first rotor 100 and of the second rotor 200 are synchronized in such a way that the first rotor 100 and the second rotor 200 move in the transfer region 4 with coordinated trajectories. Subsequently or simultaneously, the second force-fit and/or form-fit connection between the object 2 and the second rotor 200 is embodied in the transfer region 4. Subsequently or simultaneously, the first force-fit and/or form-fit connection is released. In particular, it may be provided that the coordinated movement paths are embodied in such a way that the formation of the second force-fit and/or form-fit connection between the object 2 and the second rotor 200 and/or the release of the first force-fit and/or form-fit connection between the object 2 and the first rotor 100 is triggered or at least supported by the movement of the first rotor 100 and the second rotor 200 on the coordinated trajectories.

In this context, it may be provided that the controller 30 energizes the first drive coils 11 and the second drive coils 21, respectively, in such a way that the first rotor 100 and the second rotor 200 are synchronized in such a way that the first rotor 100 and the second rotor 200 move in the transfer region 4 with coordinated trajectories. Furthermore, it may be provided that the controller 30 energizes the first drive coils 11 and the second drive coils 21, respectively, in such a way that the first rotor 100 and/or the second rotor 200 move in such a way that a second force-fit and/or form-fit connection is embodied between the object 2 and the second rotor 200 in the transfer region 4. Furthermore, it may be provided that the controller 30 energizes the first drive coils 11 and the second drive coils 21, respectively, in such a way that the first rotor 100 and/or the second rotor 200 will move in such a way that the first force-fit and/or form-fit connection is released.

Also shown in FIGS. 1 and 2 is an optional support rail 40 arranged below the objects 2. The support rail 40 may serve to provide a mechanical safeguard for the objects 2, so that objects 2 for which the transfer from the first rotor 100 to the second rotor 200 does not function properly do not fall to the ground due to gravity, but are supported. The support rail 40 is thereby arranged partly along the first drive units 10 and partly along the second drive units 20. It may also be provided that the support rail 40 is arranged in a direction of travel 5 behind the transfer region 4 along both the first drive units 10 and along the second drive units 20, in particular if not each of the objects 2 is to be transferred from the first rotor 100 to the second rotor 200. Also, the support rail 40 may be arranged in the transfer region adjacent to the object 2 so that mechanical support of the object 2 by the support rail 40 is always available there.

The first retaining element 110 and the second retaining element 210 are arranged laterally of the objects 2 with respect to the direction of travel 5.

The objects 2 may comprise parts or components within a production system or liquid vessels.

In FIG. 1, the first drive unit 10 in the transfer region 4 is embodied as a linear drive unit viewed in relation to the direction of travel 5, while the second drive unit 20 is embodied as a curved drive unit. Of course, both the first drive unit 10 and the second drive unit 20 may be embodied as a linear drive unit in the transfer region 4. Of course, both the first drive unit 10 and the second drive unit 20 may be embodied as a curved drive unit in the transfer region 4.

Figure 3:
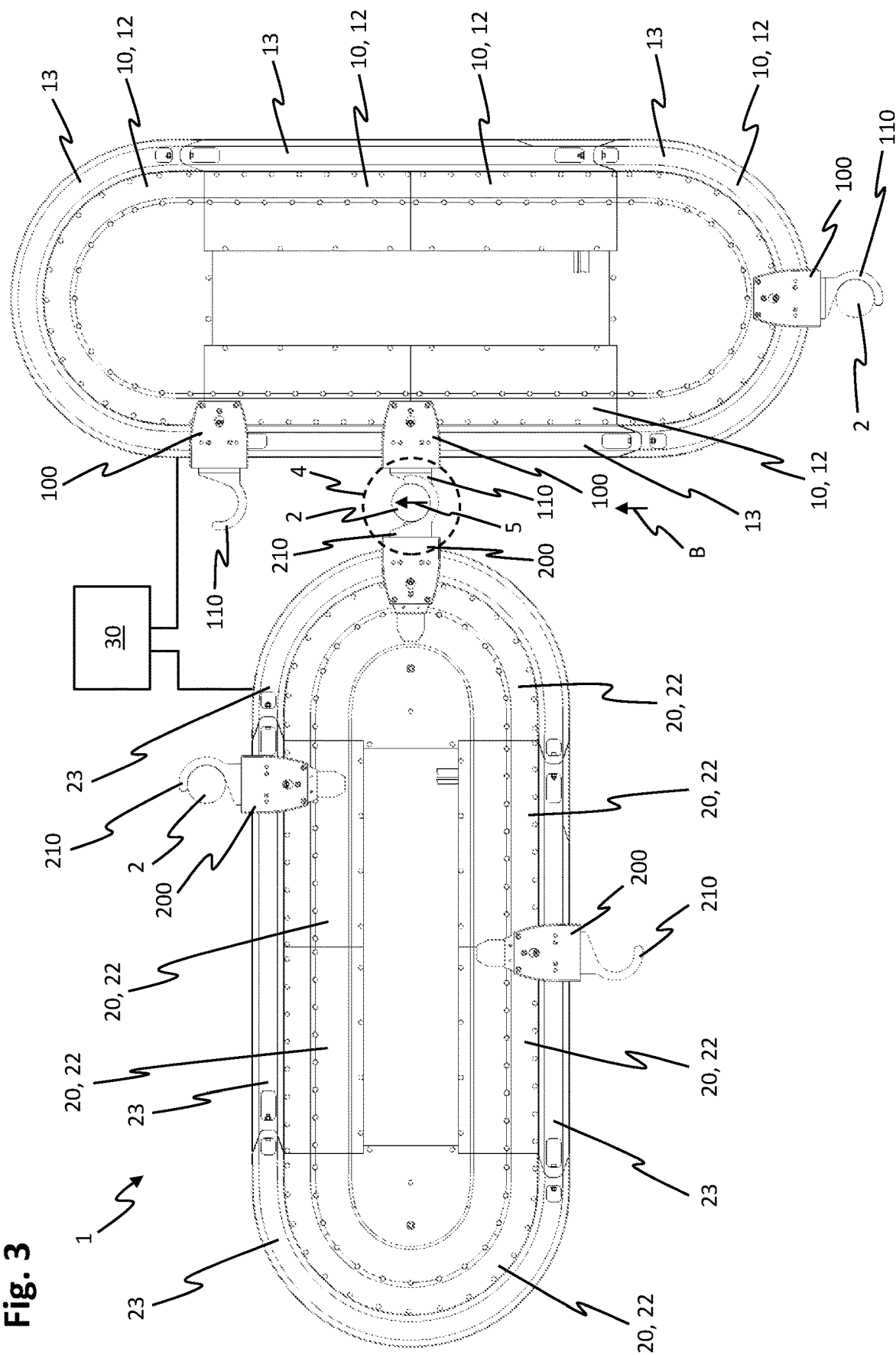
FIG. 3 shows a top view of a further linear transport system.

FIG. 3 shows a top view of a further linear transport system 1 that corresponds to the linear transport system 1 of FIGS. 1 and 2, unless differences are described below. In this embodiment example, the first retaining elements 110 as well as the second retaining elements 210 are embodied differently than in the embodiment example of FIG. 1. The first retaining element 110 and the second retaining element 210 are arranged behind the objects 2 with respect to the direction of travel 5. Furthermore, the support rail 40 is not provided, but could be provided analogously to FIG. 1.

Figure 4:
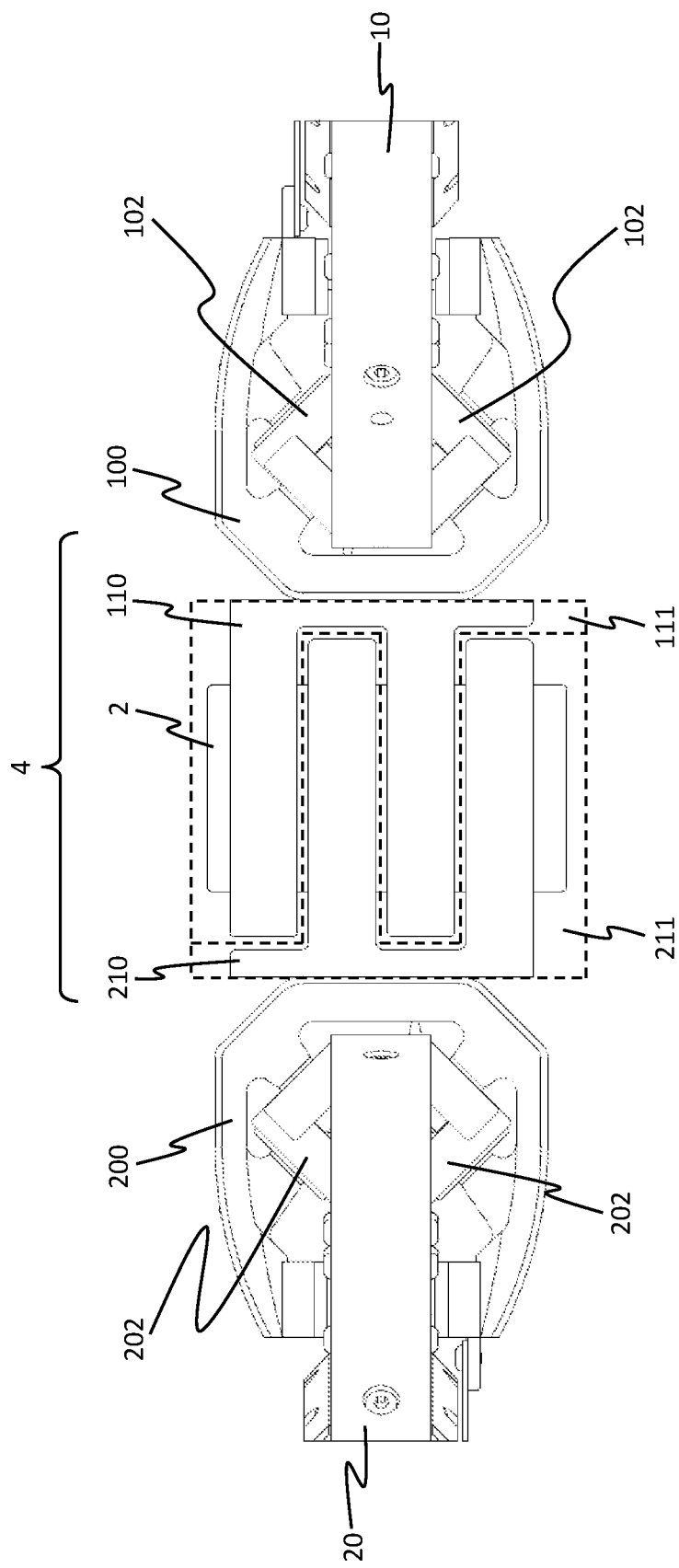
FIG. 4 shows a side view of the linear transport system of FIG. 3.

FIG. 4 shows a side view of a section of the linear transport system 1 of FIG. 3 from the viewing direction designated B. The first retaining element 110 is arranged in the transfer region 4 in a first spatial partial region 111. The second retaining element 210 is arranged in the transfer region 4 in a second spatial partial region 211. The first spatial partial region 111 is outside of the second spatial partial region 211. The first partial region 111 and the second partial region 211 are indicated by dashed lines.

This arrangement allows both the first retaining element 110 and the second retaining element 210 to retain the object 2 from behind the object 2, as viewed in the direction of travel 5, in the transfer region 4. Furthermore, both the first retaining element 110 and the second retaining element 210 may be moved independently of each other, since in the transfer region 4 the first retaining element 110 and the second retaining element 210 occupy different positions in the first spatial partial region 111 and the second spatial partial region 211, respectively.

In other words, the first retaining element 110 and the second retaining element 210 are arranged in such a way that when the first rotor 100 and the second rotor 200 are moved in the transfer region 4, the first retaining element 110 and the second retaining element 210 cannot collide with each other. Thus, the first retaining element 110 and the second retaining element 210 may be embodied in such a way that they do not touch each other or that no contact may occur between them.

As an alternative to the illustration in FIGS. 3 and 4, it is also possible for both the first retaining element 110 and the second retaining element 210 to be arranged in front of the objects in the direction of travel 5. Furthermore, it may be provided that the first retaining element 110 or the second retaining element is arranged laterally analogous to FIGS. 1 and 2. Furthermore, it may be provided that the first retaining element 110 or the second retaining element 210 is arranged laterally and then the second retaining element 210 or the first retaining element 110 is arranged in front of the objects 2 in the direction of travel 5.

In the illustrations of FIGS. 1 to 4, the first drive units 10 form a closed path and the second drive units 20 form a closed path. It may also be provided that further such paths or also non-closed paths are provided in the linear transport system 1. Furthermore, it may also be provided that both the first drive units 10 and the second drive units 20 are part of a self-contained common path. The process for transferring the objects 2 remains identical in each case.

Figure 5:
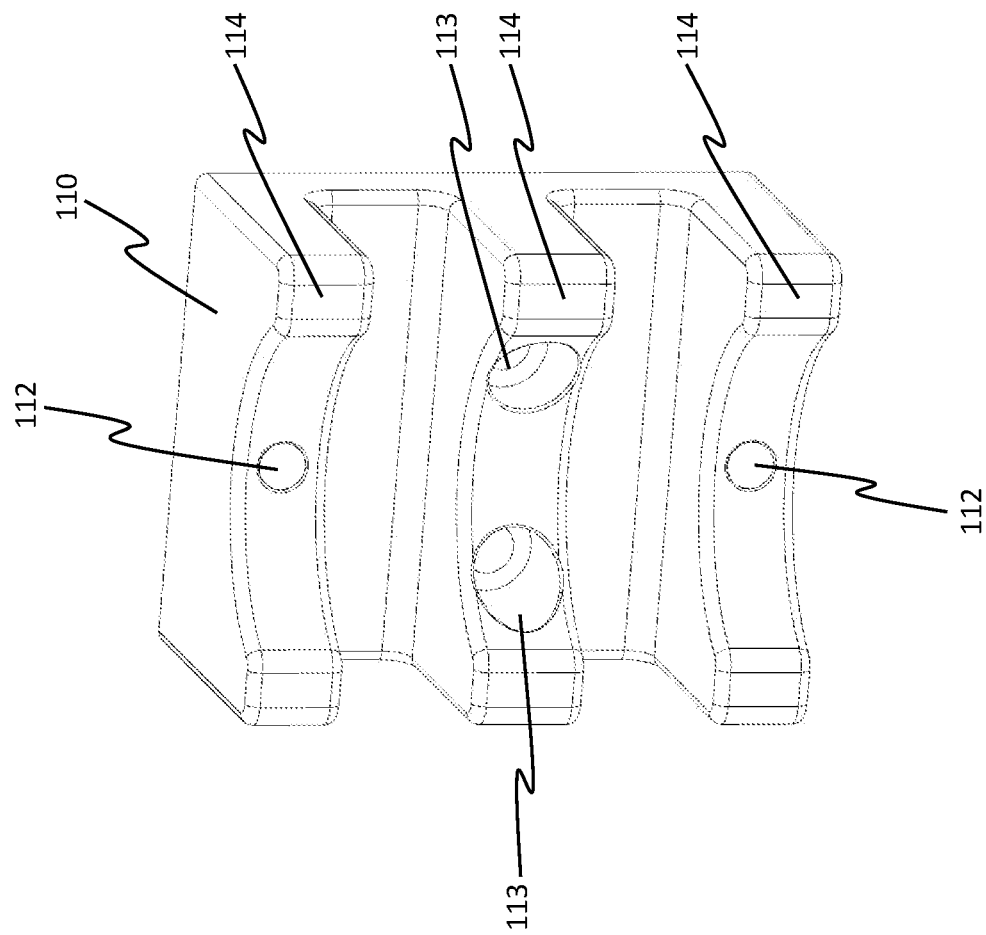
FIG. 5 shows an isometric view of a first retaining element.

FIG. 5 shows an isometric view of a first retaining element 110 that may be used in the linear transport systems 1 described so far. The first retaining element 110 comprises two first magnets 112 and two first fastening holes 113. Furthermore, the first retaining element 110 comprises three first retaining brackets 114, wherein the fastening holes 113 are arranged in a central one of the first retaining brackets 114 and the first magnets 112 are arranged in the other two retaining brackets 114. Thus, the first retaining element 110 comprises at least one first magnet 112. If the object 2 comprises, at least in part, a ferromagnetic material, the object 2 may be held against the first magnets 112. Thus, the first force-fit and/or form-fit connection comprises at least one force-fit component based on the magnetic attraction of the first magnets and the ferromagnetic material of the object 2. With the aid of the first fastening holes 113, the first retaining element 110 may be fastened to one of the first rotors 100, e.g. via a screw connection. A second retaining element 210 could be embodied identically to the first retaining element 110 shown here.

Figure 6:
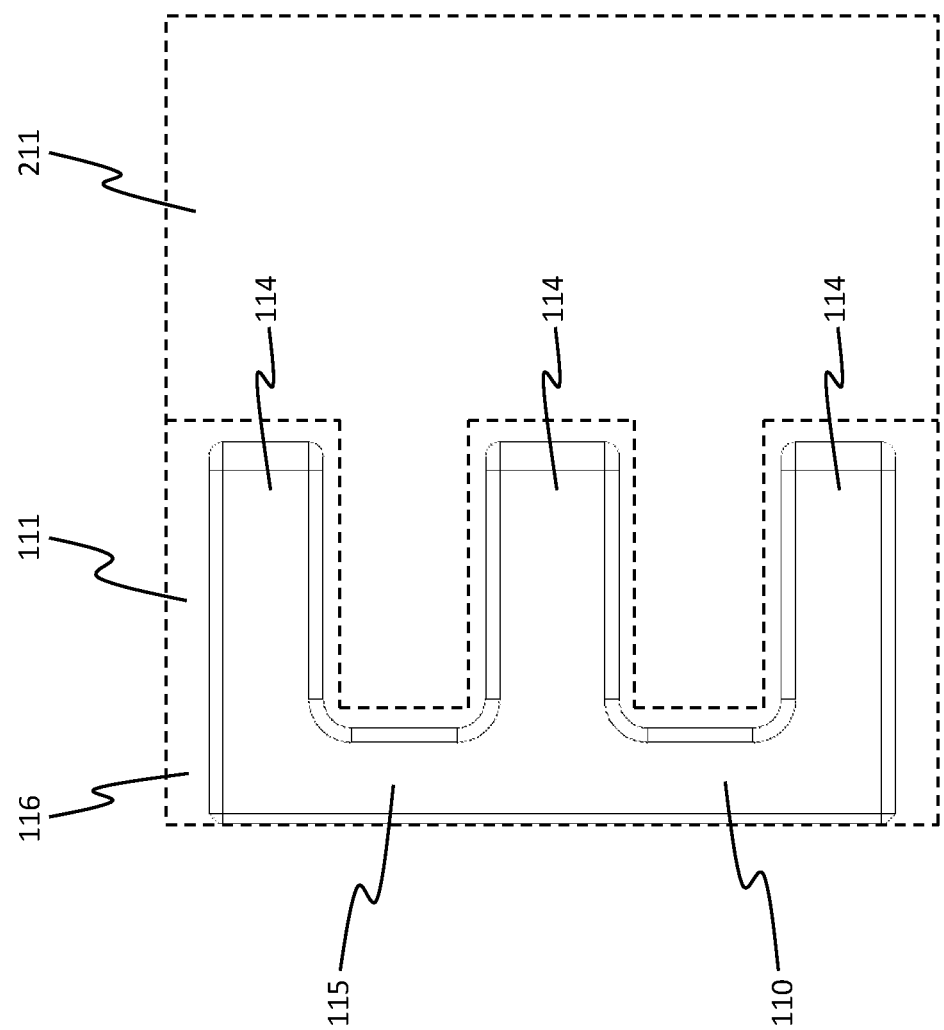
FIG. 6 shows a side view of the first retaining element of FIG. 5.

FIG. 6 shows a side view of the first retaining element 110 of FIG. 5. The first retaining brackets 114 are connected via a first fastening plate 115. Furthermore, in FIG. 6, the first spatial partial region 111 and the second spatial partial region 211 are shown as dashed lines, wherein a second retaining element 210 may be arranged in the second spatial partial region 211.

In the first retaining element 110 of FIGS. 5 and 6, the first retaining brackets 114 are immovable relative to the first fastening plate 115. The first force-fit and/or form-fit connection is formed or released exclusively by a movement of the first rotor 100 and the second rotor 200.

Figure 7:
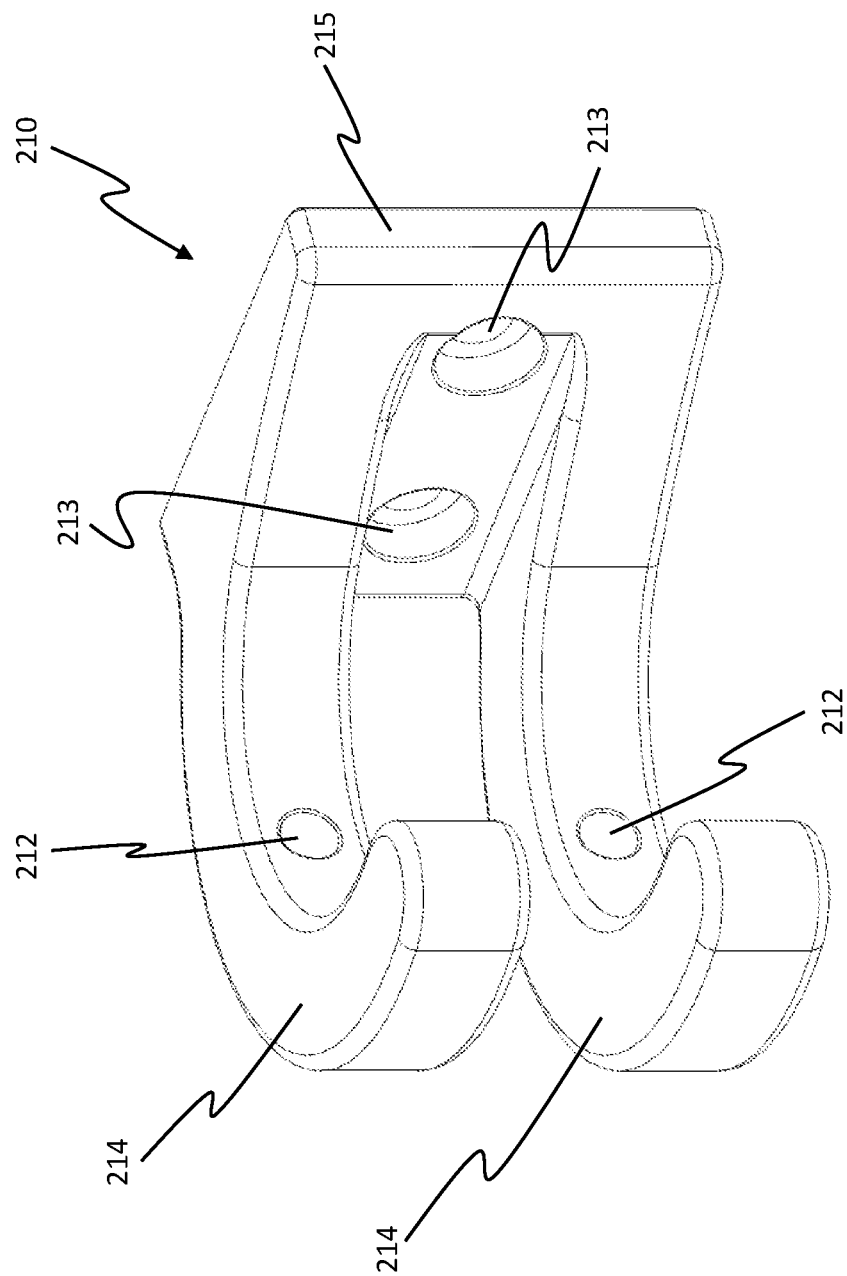
FIG. 7 shows an isometric view of a second retaining element.

FIG. 7 shows an isometric view of a second retaining element 210 that may be used in the linear transport systems 1 described so far. The second retaining element 210 comprises two second magnets 212 and two second retaining brackets 214, wherein a second magnet 212 is arranged in each of the second retaining brackets 214. The second retaining brackets are connected to a second fastening plate 215. The second fastening plate 215 comprises two second fastening holes 213 for connecting the second retaining element 210 to the second rotor. Thus, the second retaining element 210 comprises at least one second magnet 212. If the object 2 comprises, at least in part, a ferromagnetic material, the object 2 may be held at the second magnets 212. Thus, the second force-fit and/or form-fit connection comprises at least one force-fit component based on the magnetic attraction of the second magnets 212 and the ferromagnetic material of the object 2. A first retaining element 110 could be embodied identically to the second retaining element 210 shown here.

The second retaining element 210 of FIG. 7 may be embodied in such a way that it is arranged in the transfer region 4 only in the second partial region 211 (see FIG. 6). In the second retaining element 210 of FIG. 7, the second retaining brackets 214 are immovable relative to the second fastening plate 215. Formation or release of the second force-fit and/or form-fit connection is effected exclusively by a movement of the first rotor 100 and the second rotor 200.

If a first retaining element 110 identical to the second retaining element 210 or arranged in a mirrored manner is used on the first rotor 100, it may be provided that the first retaining element 110 and the second retaining element 210 are arranged at an offset with regard to one another so that the first retaining element 110 may be arranged in the transfer region 4 in a first spatial partial region 111 and the second retaining element 210 may be arranged in the transfer region 4 in a second spatial partial region 211. The first spatial partial region 111 is then outside the second spatial partial region 211.

Figure 8:
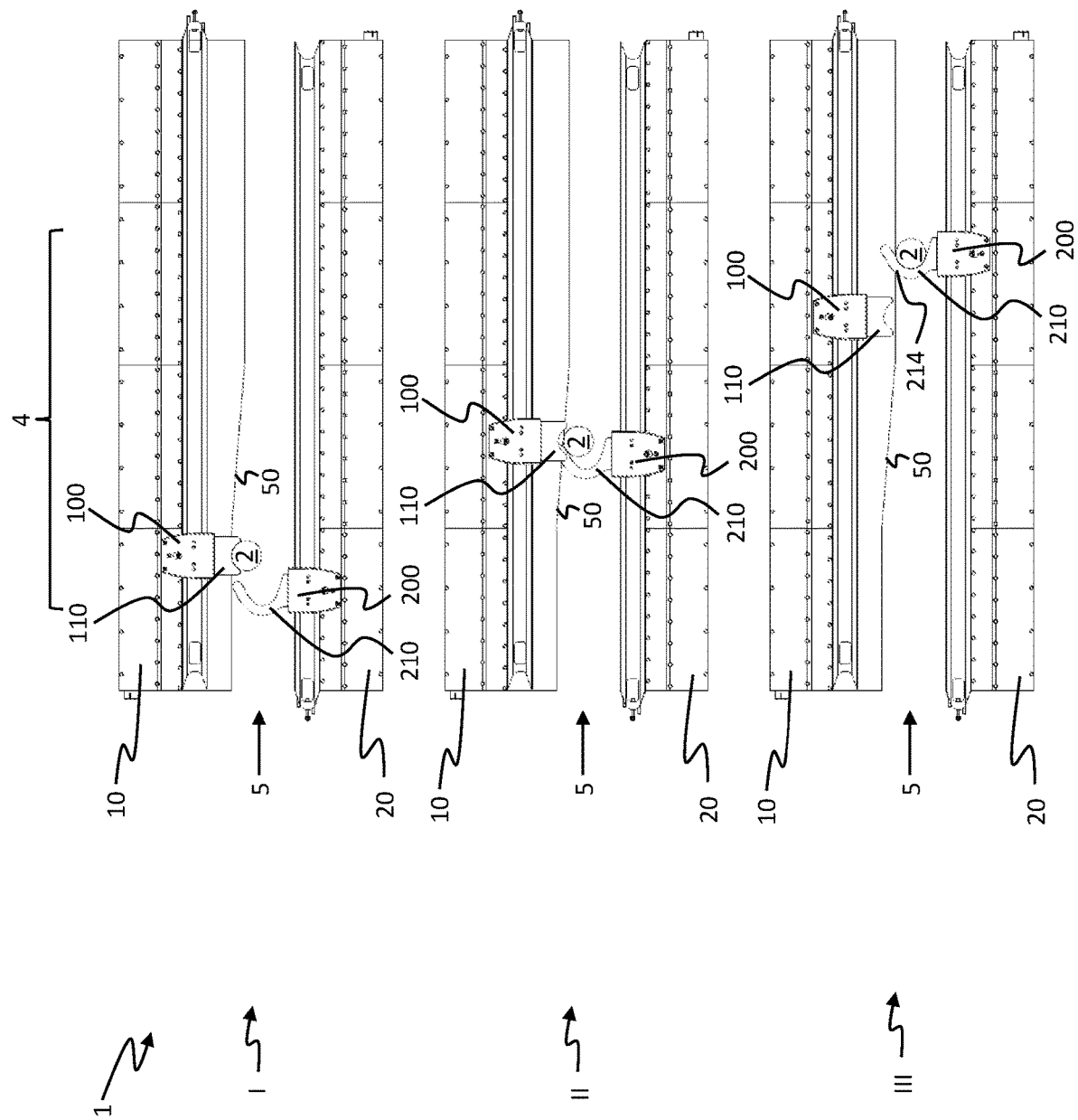
FIG. 8 shows a transfer of an object from the first retaining element of FIGS. 5 and 6 to the second retaining element of FIG. 7.

FIG. 8 shows in three partial figures a top view of a transfer region 4 of a linear transport system 1 between a first drive unit 10 and a second drive unit 20. Three successive states of the transfer of an object 2 from a first rotor 100 to a second rotor 200 are shown. The first state of transfer is marked I, the second state of transfer is marked II, and the third state of transfer is marked III. The first rotor 100 having a first retaining element 110 is arranged in a transfer region 4, wherein the first retaining element 110 is embodied as described in connection with FIGS. 5 and 6. The second rotor 200 having a second retaining element 210 is also arranged in the transfer region 4, wherein the second retaining element 210 is embodied as described in connection with FIG. 7.

In the first state of the transfer I shown above, the object 2 is attached to the first rotor 100 by a first force-fit and/or form-fit connection, in this case with the aid of the first magnets 112 and the ferromagnetic material of the object 2. With reference to a direction of travel 5 of the first rotor 100 and the second rotor 200, respectively, the first retaining element 110 is arranged to the side of the object 2 and the second retaining element 210 is arranged behind the object 2. In order to allow for the transfer of the object 2, the second rotor 200 must now move faster in the direction of travel 5 than the first rotor 100.

In the second state of the transfer II, which is shown in the center, movements of the first rotor 100 and the second rotor 200 are now synchronized in such a way that the first rotor 100 and the second rotor 200 move in the transfer region 4 with coordinated paths of movement and a second force-fit and/or form-fit connection is embodied between the object 2 and the second rotor 200 in the transfer region 4. This is done with the aid of the second magnets 212 of the second retaining element 210. In the embodiment shown, the second rotor 200 has not yet completely reached the object, but is immediately in front of it, so that the second magnets of the second retaining element 210 may form the second force-fit and/or form-fit connection. Now, the second rotor 200 is moved further faster than the first rotor 100 in the direction of travel 5 in order to release the first force-fit and/or form-fit connection. The second retaining element 210 thereby virtually takes the object 2 with it, and due to the arrangement of the second retaining brackets 214 behind the object 2, a transfer of the object 2 is triggered by this faster movement.

In the lower illustration, i.e. the third state of transfer III, this transfer has then taken place and the object 2 is only connected to the second rotor 200 via the second force-fit and/or form-fit connection.

The different speeds of the first rotor 100 and the second rotor 200 thus allow for the transfer of the object 2. For this purpose, the first rotor 100 and the second rotor 200 move along coordinated paths of motion, which in this example are defined in particular by the different speeds.

Also shown in FIG. 8 is an optional deflector 50, which is arranged to move the object 2 along the pivoting deflector 50 to assist in the transfer from the first rotor 100 to the second rotor 200. In this regard, the deflector 50 may be connected to the first drive unit 10 or the second drive unit 20, or may be attached independently of the drive units 10, 20. In an alternative embodiment, it may be provided that the deflector 50 is embodied to be pivotable and is pivoted into the area of the object 2 only when required.

Alternatively to the illustration of FIG. 8, it may be provided that the first retaining element 110 is also arranged behind the object in the direction of travel 5, analogously to the second retaining element 210. Likewise, it may be provided that the first retaining element 110 is embodied as shown in FIG. 7 and the second retaining element 210 is embodied as shown in FIGS. 5 and 6.

Figure 9:
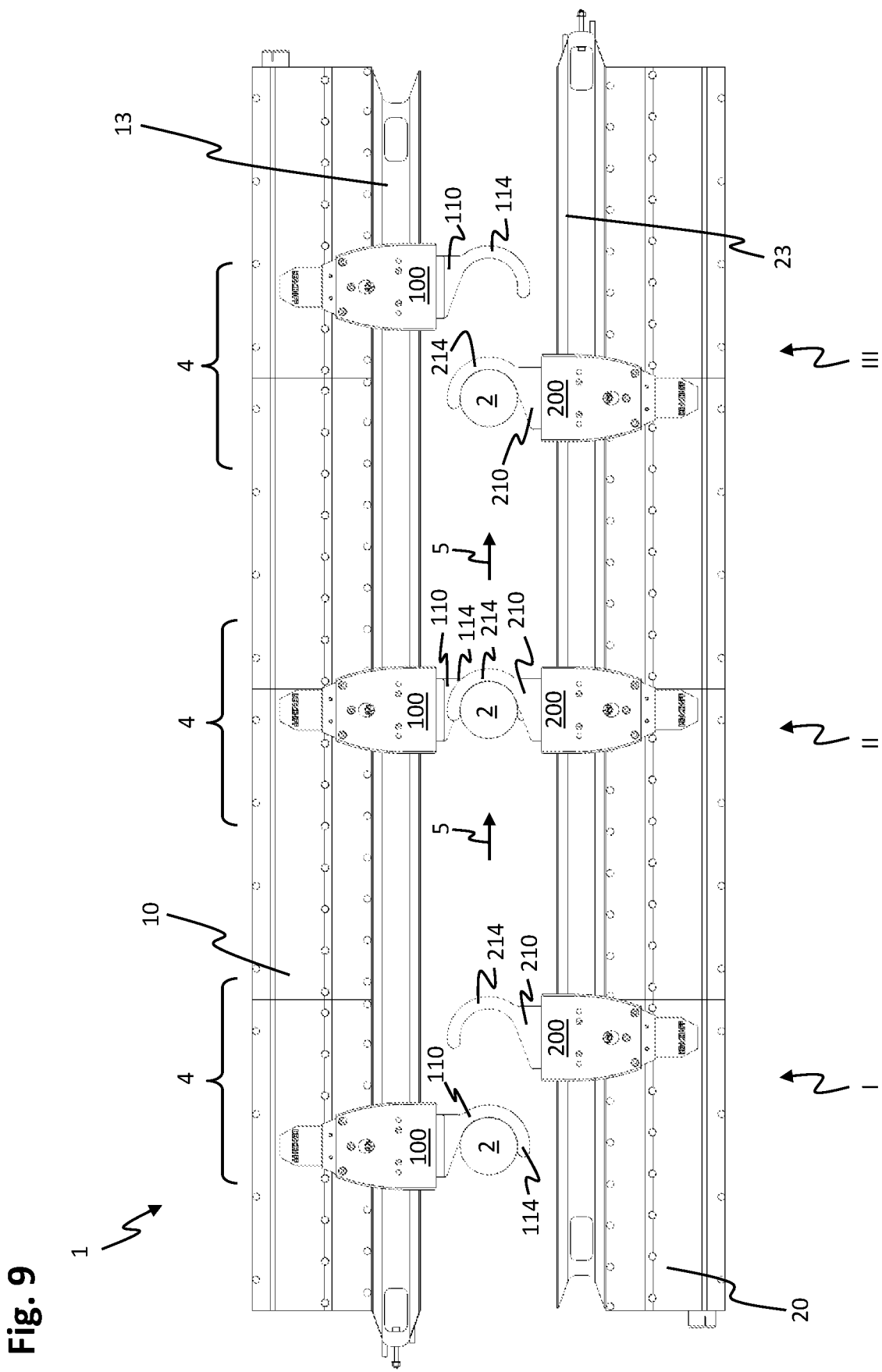
FIG. 9 shows a further transfer of an object from a first retaining element to a second retaining element.

FIG. 9 shows a top view of the three transfer states I, II, III from left to right. The transfer regions 4 of a linear transport system 1 between a first drive unit 10 and a second drive unit 20 are each shown with a curved bracket. The first rotor 100 having a first retaining element 110 is arranged in a transfer region 4. The second rotor 200 having a second retaining element 210 is also arranged in the transfer region 4. Both the first retaining element 110 and the second retaining element 210 are embodied as described in connection with FIG. 7. Both the first retaining bracket 114 and the second retaining bracket 214 are arranged in front of the object 2 in the direction of travel 5.

In the partial illustration on the left, in the first state of transfer I, the object 2 is attached to the first rotor 100 via a first force-fit and/or form-fit connection, in this case with the aid of the first magnets 112 and the ferromagnetic material of the object 2. In order to enable the transfer of the object 2, the second rotor 200 must now move more slowly in the direction of travel 5 than the first rotor 100.

As shown in the middle partial illustration, the second state of transfer II, movements of the first rotor 100 and the second rotor 200 are now synchronized in such a way that the first rotor 100 and the second rotor 200 move with coordinated trajectories in the transfer region 4 and a second force-fit and/or form-fit connection is formed between the object 2 and the second rotor 200 in the transfer region 4. This is done with the aid of the second magnets 212 of the second retaining element 210. Now, the second rotor 200 is moved further slower than the first rotor 100 in order to release the first force-fit and/or form-fit connection. The second retaining element 210 thereby virtually takes the object 2 with it, and due to the arrangement of the second holding brackets 214 in front of the object 2, a transfer of the object 2 is triggered by this slower movement.

In the right-hand partial illustration, i.e. in the third state of transfer III, this transfer has then taken place, and the object 2 is now only connected to the second rotor 200 with the aid of the second force-fit and/or form-fit connection.

As an alternative to the illustration of FIG. 9, it may be provided that the first retaining element 110 is arranged laterally of the object with respect to the direction of travel 5 as shown in FIGS. 5 and 6. Likewise, it may be provided that the first retaining element 110 is embodied as shown in FIG. 7 and the second retaining element 210 is embodied as shown in FIGS. 5 and 6.

Thus, the transfer of the object 2 shown in FIGS. 8 and 9 is based on the fact that a synchronized movement of the first rotor 100 and the second rotor 200 carries out the process, the transfer being supported by the embodiment of the first retaining element 110 and the second retaining element 210. Furthermore, the transfer may also be assisted by the deflector 50.

The objects 2 have always been represented as round up to now. In principle, other geometries are conceivable, as well, in particular when using first retaining elements 110 with first magnets 112 and second retaining elements 210 with second magnets 212, which may also be transferred using the method described.

Figure 10:
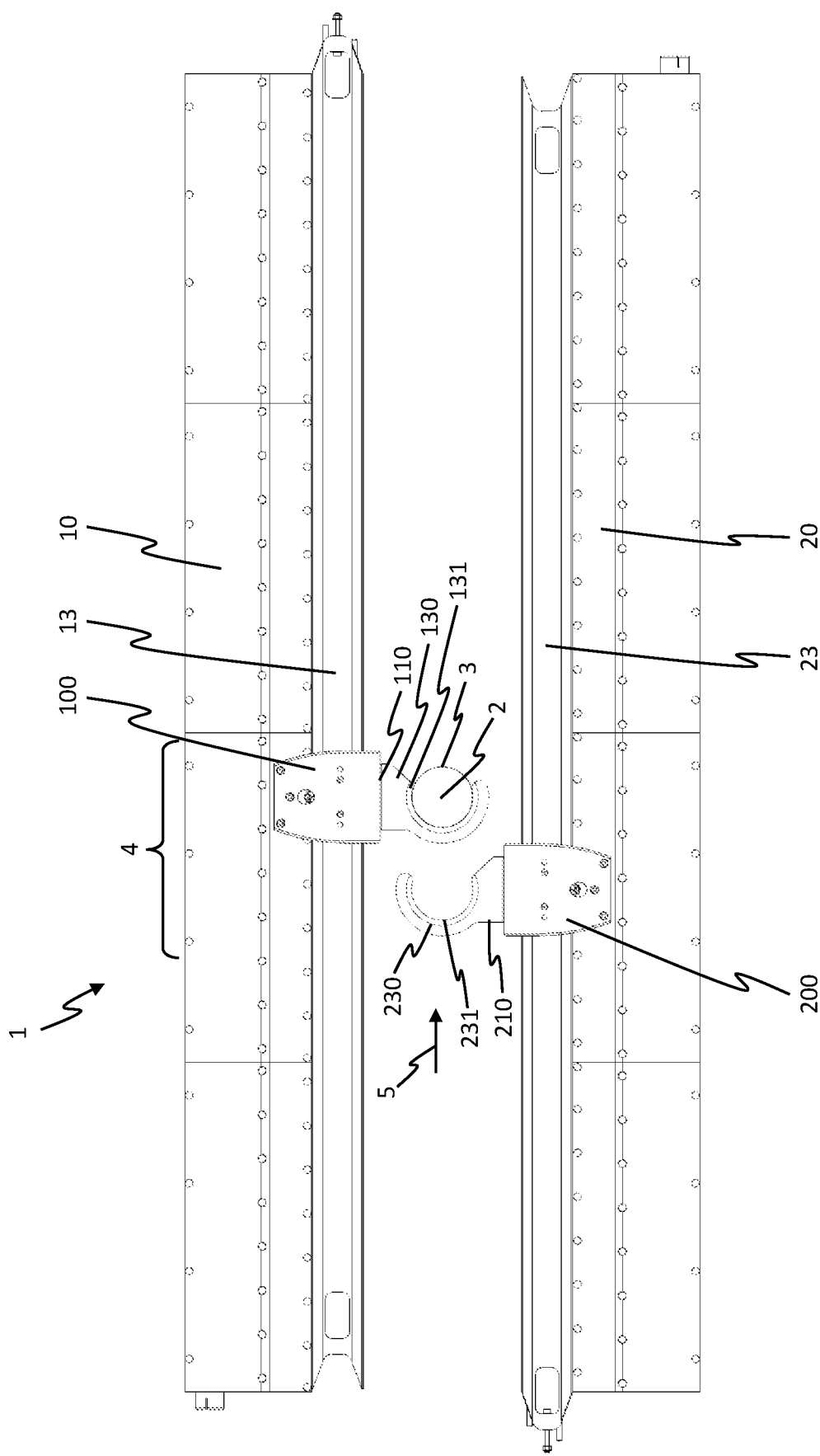
FIG. 10 shows a transfer region having a further first retaining element and a further second retaining element.

FIG. 10 shows a top view of a transfer region 4 of a linear transport system 1 between a first drive unit 10 and a second drive unit 20. In this embodiment, the first retaining element 110 and the second retaining element 210 are embodied differently than described so far. The first retaining element 110 comprises at least one first circular arc-shaped receptacle 130 with a first rubber lip 131. The second retaining element 210 has at least one second circular arc-shaped receptacle 230 with a second rubber lip 231. The object 2 comprises at least one circular object portion 3. The first circular arc-shaped receptacle 130 and the second circular arc-shaped receptacle 230 each comprise an interior angle larger than 180 degrees. With the aid of the first rubber lip 131, the object is held at the first retaining element 110 via a first force-fit and form-fit connection. If the second rotor 200 now catches up with the first rotor 100 by moving the second rotor 200 faster than the first rotor 100, then a second force-fit and form-fit connection may be formed between the second rotor 200 and the object 2. Subsequently, by moving the second rotor 200 faster, the first force-fit and form-fit connection may be released.

In this embodiment, the first retaining element 110 and the second retaining element 210 are arranged at least partially behind the object 2 in the transfer region 4 with respect to the direction of travel 5 of the first rotor and of the second rotor. The second rotor 200 is moved faster than the first rotor 100. In another embodiment example, it may be provided that the first retaining element 110 and the second retaining element 210 are arranged at least partially in front of the object 2 in the transfer region 4 with respect to the direction of travel 5 of the first rotor 100 and the second rotor 200. In this case, the second rotor 200 is moved more slowly than the first rotor 100.

The first circular arc-shaped receptacle 130 may be arranged in a first retaining bracket 114. The second circular arc-shaped receptacle 230 may be arranged in a second retaining bracket 214.

It may also be provided that the first retaining element 110 comprises at least one first magnet 112 as described in connection with FIGS. 5 to 9, and the second retaining element 210 comprises at least one second circular arc-shaped receptacle 230 having a second rubber lip 231 as described in connection with FIG. 10. In another embodiment, the second retaining element 210 comprises at least one second magnet 212 as described in connection with FIGS. 5 to 9 and the first retaining element comprises at least one first circular arc-shaped receptacle 130 with a first rubber lip 131 as described in connection with FIG. 10.

Likewise, it is conceivable that the first retaining element 110 comprises both at least a first magnet 112 and a first circular-arc-shaped receptacle 130 having a first rubber lip 131 and/or the second retaining element 210 comprises both at least a second magnet 212 and a second circular-arc-shaped receptacle 230 having a second rubber lip 231.

In the transfers of the object 2 described in connection with FIGS. 8 to 10, it may be provided that a speed difference of the first rotor 100 and the second rotor is above a predetermined value so that the first force-fit and/or form-fit connection may be released. In this regard, it may be provided that the first rotor 100 and the second rotor 200 each move at a constant but different speed during the transfer. Furthermore, especially in the case that both the first drive unit 10 and the second drive unit 20 are linear in the transfer region 4, it may be provided that the first rotor 100 and the second rotor 200 move a predetermined distance at an identical speed and only then the speed difference is adjusted.

Figure 11:
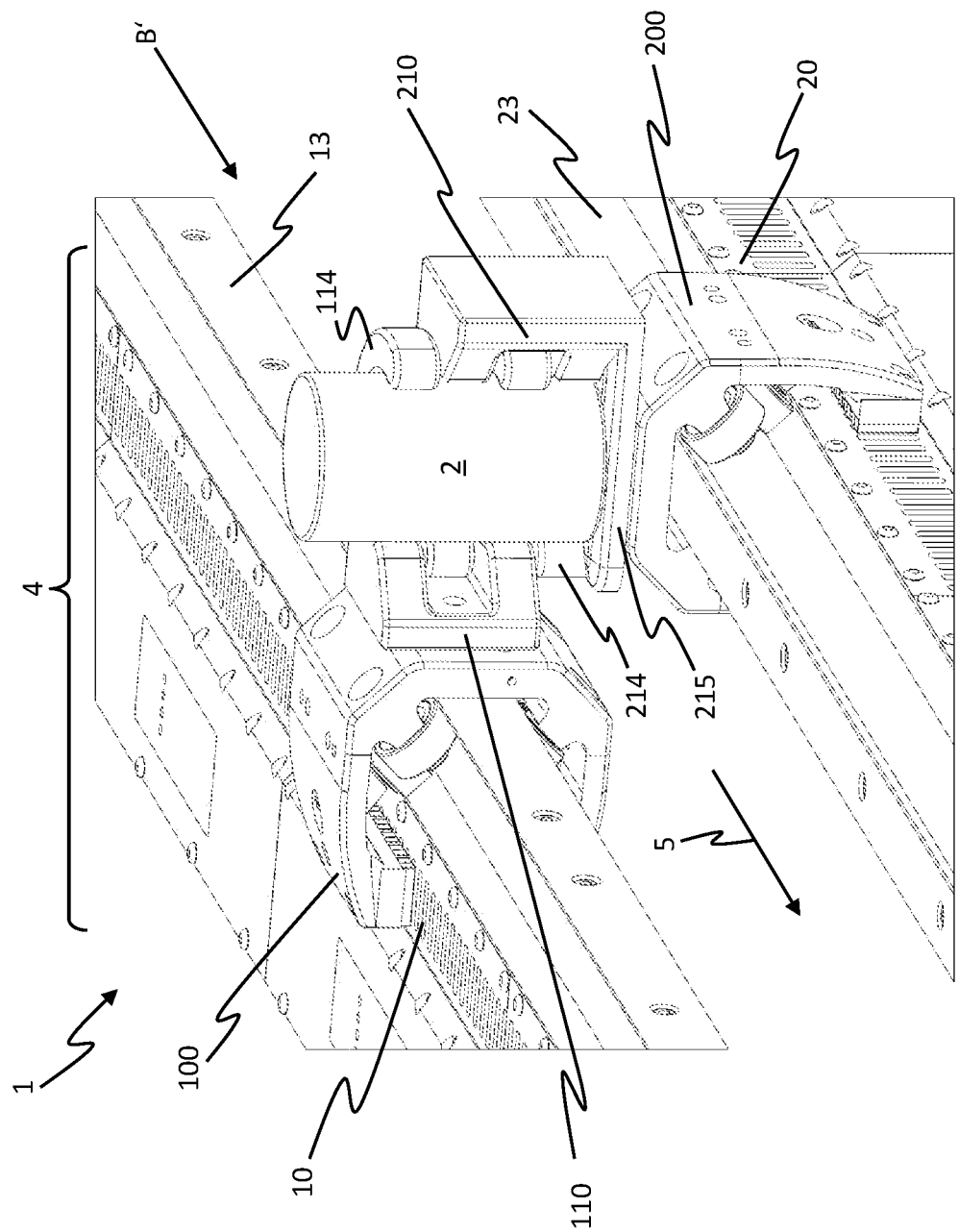
FIG. 11 shows a top view of a further linear transport system in a transfer region.

FIG. 11 shows an isometric view of a transfer region 4 of a linear transport system 1 between a first drive unit 10 and a second drive unit 20. In contrast to the previous illustrations of linear transport systems 1, in this embodiment the arrangement of the first drive units 10 and the second drive units 20 is not in a plane, but perpendicular to each other. In this case, the first retaining element 110 of the first rotor 100 corresponds to the second retaining element 210 shown in FIG. 7. The second rotor 200 with the second retaining element 210 is arranged in such a way that the object 2 stands on the second fastening plate 215 of the second retaining element 210. The second retaining element 210 may thereby comprise at least one second magnet 212 and/or at least one second circular arc-shaped receptacle 230 with a second rubber lip 231. The first retaining element 110 may thereby comprise at least a first magnet 112 and/or at least a first circular arc-shaped receptacle 130 having a first rubber lip 131. The properties of the first retaining element 110 and the second retaining element 210 may thereby be as already described.

Figure 12:
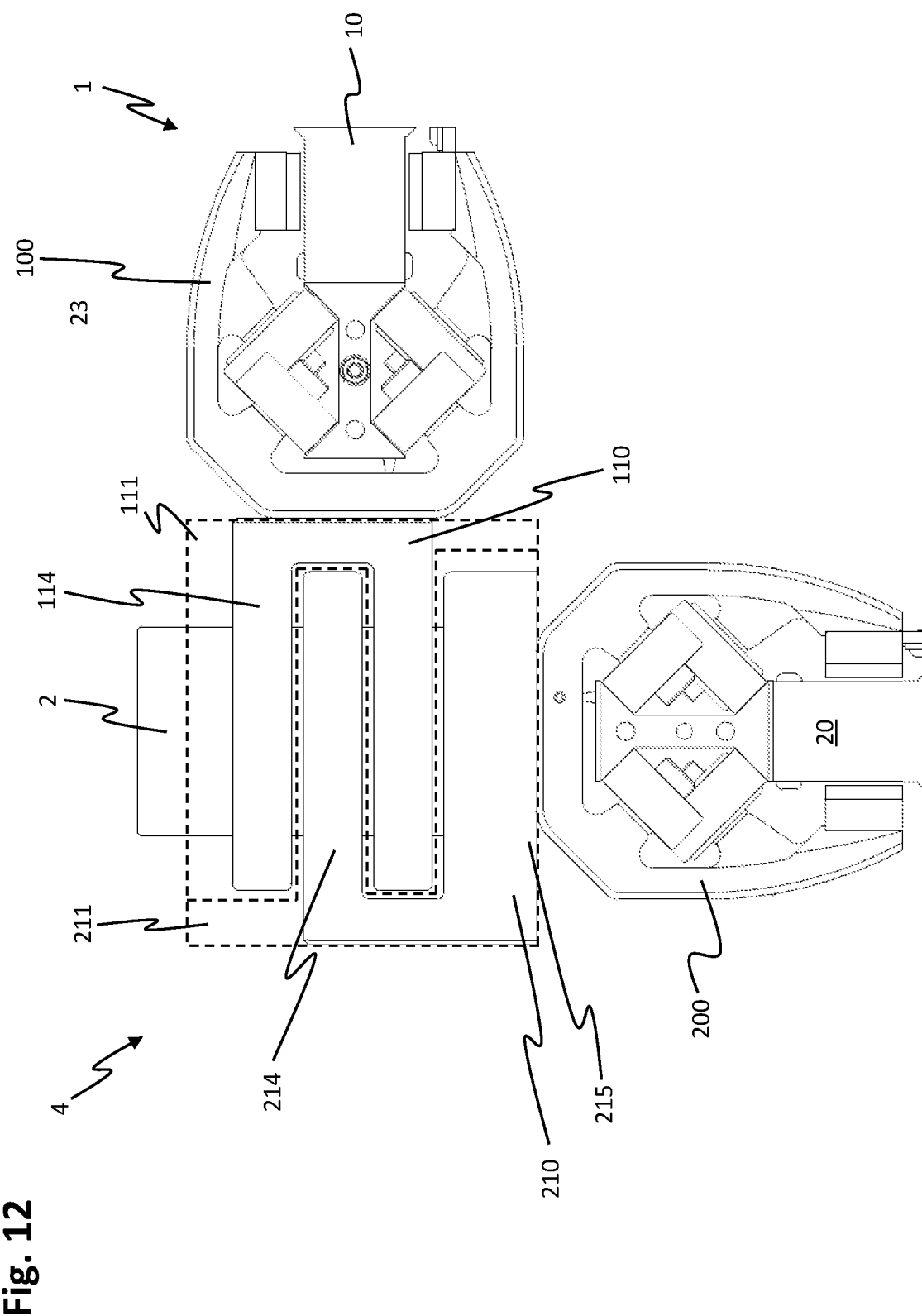
FIG. 12 shows a cross-section through the transfer region of FIG. 11.

FIG. 12 shows a cross-section of the transfer region 4 of the linear transport system 1 of FIG. 11 from the viewing direction B' at the time when both the first force-fit and/or form-fit connection and the second force-fit and/or form-fit connection are formed. The object 2 is standing on the second fastening plate 215. In an alternative embodiment example, it may be provided that the object 2 is arranged above the second fastening plate 215. In this case, it may be provided that the second retaining element 210 comprises more than one second retaining bracket 214, contrary to the illustration of FIG. 12.

In FIG. 12, the first spatial partial region 111 and the second spatial partial region 211 are again shown in dashed lines. The first retaining element 110 is arranged in the transfer region 4 in the first spatial partial region 111. The second retaining element 210 is arranged in the transfer region 4 in the second spatial partial region 211. The first spatial partial region 111 is outside of the second spatial partial region 211.

With the linear transport system 1 shown in FIGS. 11 and 12, a much more flexible arrangement of the first drive units 10 and the second drive units 20, and thus a much more flexible linear transport system 1, is possible.

Figure 13:
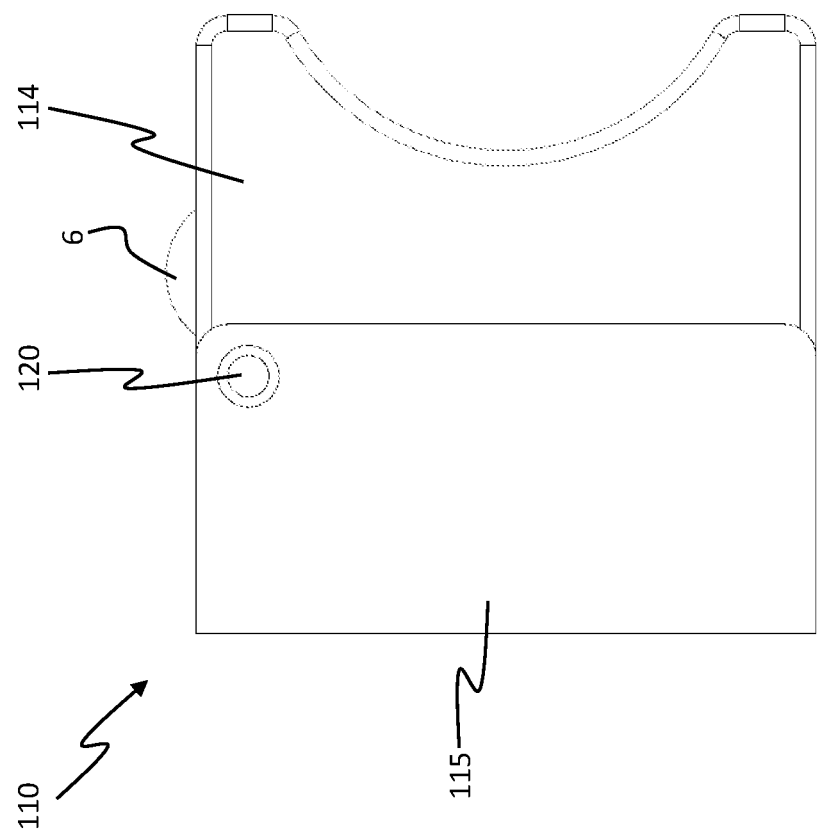
FIG. 13 shows a top view of a further first retaining element.

FIG. 13 shows a top view of a further first retaining element 110 that may be used in the linear transport systems 1 described above. The first retaining element 110 has a first axis of rotation 120. The first retaining brackets 114 are rotatably mounted with respect to the first fastening plate 115 with the aid of the rotational axis 120.

Figure 14:
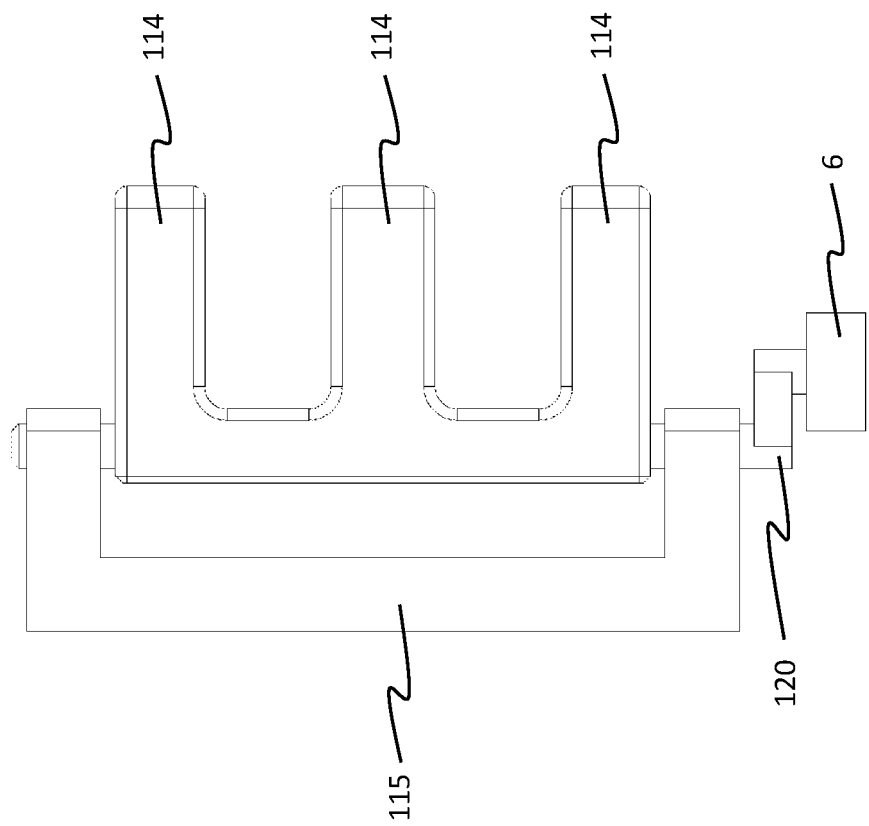
FIG. 14 shows a side view of the further first retaining element of FIG. 13.

FIG. 14 shows a side view of the first retaining element 110 of FIG. 13. A total of three first retaining brackets 114 are provided. The axis of rotation 120 is connected to an eccentric 6. A movement of the eccentric 6 may trigger the rotation of the first retaining brackets 114 about the axis of rotation 120 relative to the fastening plate 115.

Figure 15:
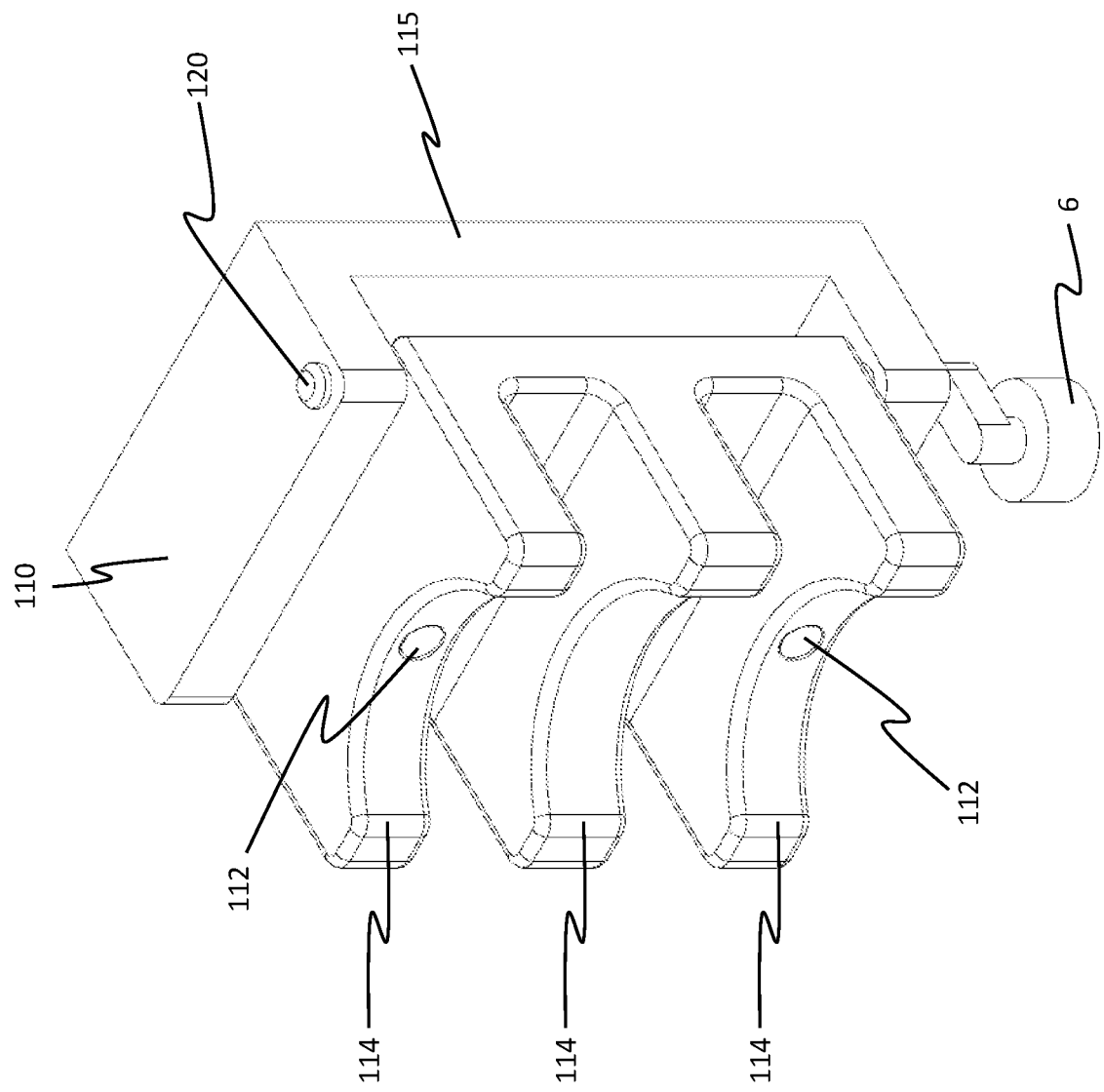
FIG. 15 shows a further side view of the further first retaining element of FIGS. 13 and 14.

FIG. 15 shows an isometric view of the first retaining element 110 of FIGS. 13 and 14. Two first retaining brackets 114 each comprise a first magnet 112. Thus, the first force-fit and/or form-fit connection may be formed with the aid of the first magnets 112 and the ferromagnetic material of the object 2.

In its basic structure, the first retaining element 110 of FIGS. 13 to 15 corresponds to the first retaining element of FIGS. 5 and 6. However, it is also possible to use the basic structure of the second retaining element 210 of FIG. 7, the basic structure of the first retaining element 110 or of the second retaining element 210 of FIG. 10, or the basic structure of the first retaining element 110 of FIGS. 11 and 12, and in this case to embody the first retaining brackets 114 so that they may rotate with the aid of the eccentric 6 and the first axis of rotation 120.

Figure 16:
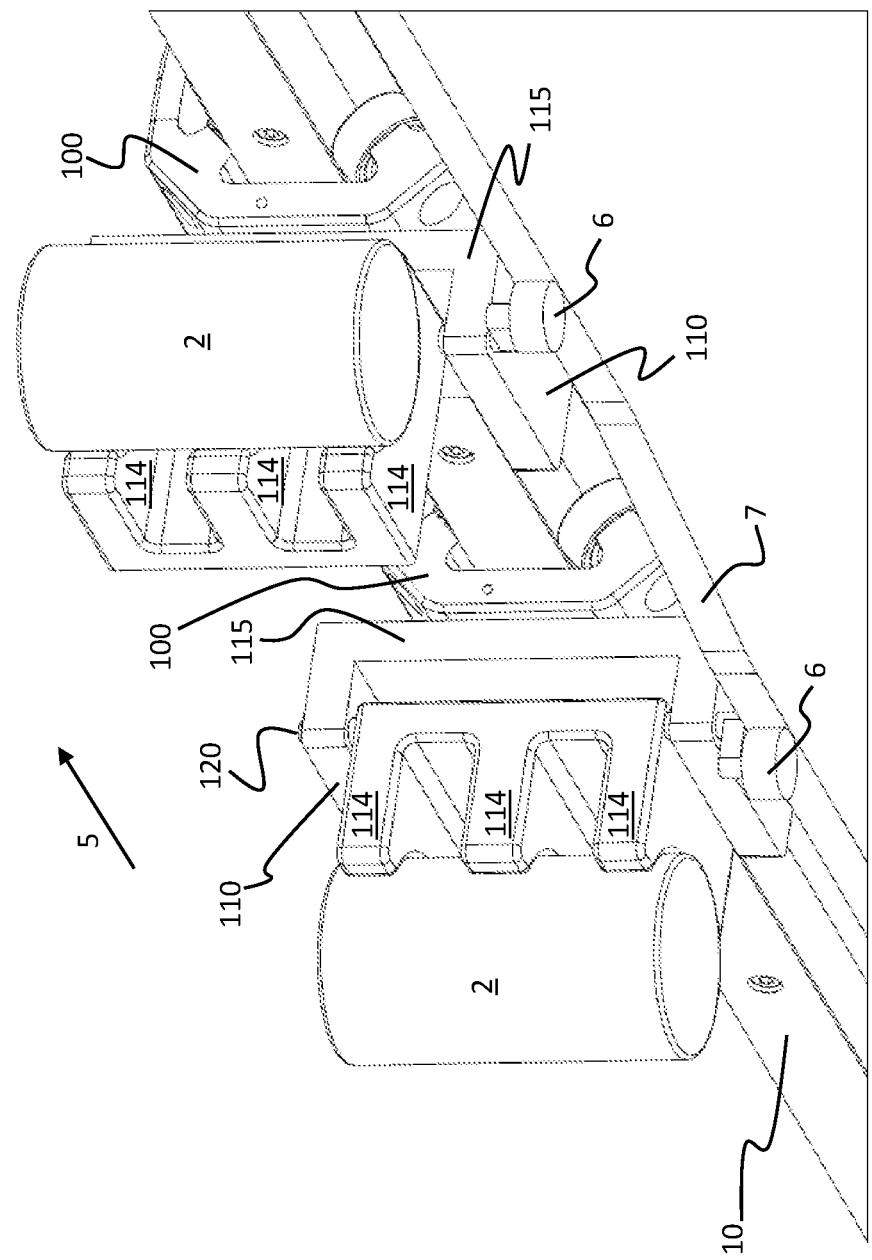
FIG. 16 shows the further first retaining element of FIGS. 13 to 15 with eccentric and control element.

FIG. 16 shows an isometric view of a linear transport system 1 having two first rotors 100 and two first retaining elements 110, wherein the two first retaining elements 110 are embodied as described in connection with FIGS. 13 to 15. A control element 7 is arranged on the first drive unit 10. The control element 7 is particularly fixed with respect to the first drive unit 10. Furthermore, it may be provided to fix the control element 7 to the first drive unit 10. If the rotor 100 having the first retaining element 110 is moved in the direction of travel 5, the control element 7 acts on the eccentric 6 and thereby partially moves the first retaining element 110.

The left-hand illustration of the first retaining element 110 shows the first retaining brackets 114 in a position relative to the first fastening plate 115 that corresponds to the illustration of FIG. 15. In the right-hand illustration of the first retaining element 110, it may be seen that the control element 7 has acted on the eccentric 6 in such a way that the first retaining brackets 114 have rotated about the axis of rotation 120 in such a way that they are now at right angles to the first fastening plate 115. Thus, the first retaining brackets 114 are no longer arranged laterally with respect to the direction of travel 5, but are arranged behind an object 2 with respect to the direction of travel 5. The action of the control element 7 on the eccentric 6, or the pivoting action of the first retaining brackets, may be supported by compression springs or the like that are not shown.

In contrast to the illustration of FIG. 16, the control element 7 may also be fixed relative to the second drive unit 20. Furthermore, provision may be made to fix the control element 7 to the second drive unit 20.

It may also be provided that the first retaining brackets 114 may be moved with the aid of the eccentric 6 and the control element 7 in the opposite direction to the direction of travel 5, i.e. in such a way that the object 2 is arranged behind the first retaining element 110 in the direction of travel 5.

Of course, the second retaining element 210 or both the first retaining element 110 and the second retaining element 210 may also be embodied as described in connection with FIGS. 13 to 15.

It may further be provided that the first rotational axis 120 is moved with the aid of a motor, in particular a stepper motor. For this purpose, it may be provided to transmit power and, if necessary, data for controlling the motor to the first rotor 100. The first retaining element 110 may then be embodied to be controllable, wherein power and data for controlling the first retaining element 110 are transmitted to the first rotor 100. The transmission of power and data may take place from the first drive unit 10 to the first rotor 100, and may also be controlled by the controller 30.

Furthermore, the second retaining element 210 of the second rotor may be embodied to be controllable in an analogous manner, wherein power and, if necessary, data for controlling the second retaining element 210 are transmitted to the second rotor 200. The transmission of power and data may be from the second drive unit 20 to the second rotor 200 and may also be controlled by the controller 30.

It may e.g. be provided that the first retaining element 110 or the second retaining element 210 is arranged laterally with respect to the direction of travel 5, basically analogously to the arrangement shown in the left-hand illustration of FIG. 16, and that the position of the first retaining element 110 or the second retaining element 210 is changed only in a transfer region 4. Furthermore, it may be provided that the control element 7 is movable so that the movement of the first retaining element 110 or the second retaining element 210 does not have to take place for each first rotor 100 or second rotor 200, respectively, and thus a selection or choice of the objects 2 to be transferred is made. An identical selection may also be made if the first retaining element 110 or the second retaining element 210 is controlled with the aid of the motor.

Figure 17:
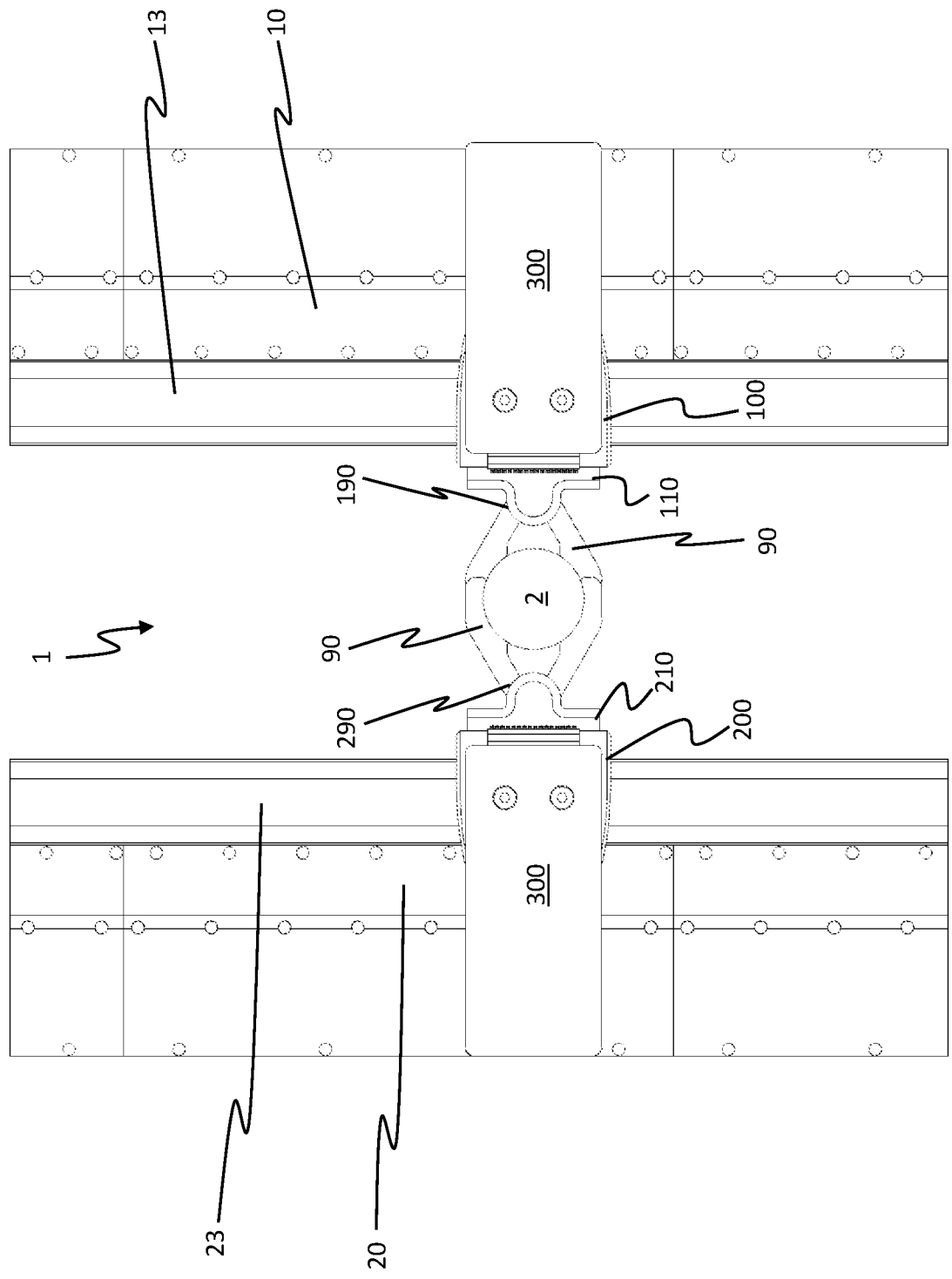
FIG. 17 shows a top view of a further linear transport system.

FIG. 17 shows a top view of a linear transport system 1 corresponding to the linear transport systems 1 already described, unless differences are mentioned below. The first retaining element 110 and the second retaining element 210 each comprise a gripper 90, the grippers 90 respectively allowing for the first force-fit and/or form-fit connection and the second force-fit and/or form-fit connection. In this context, the first retaining element 110 comprises a first gripper 190, the second retaining element 210 comprises a second gripper 290.

Figure 18:
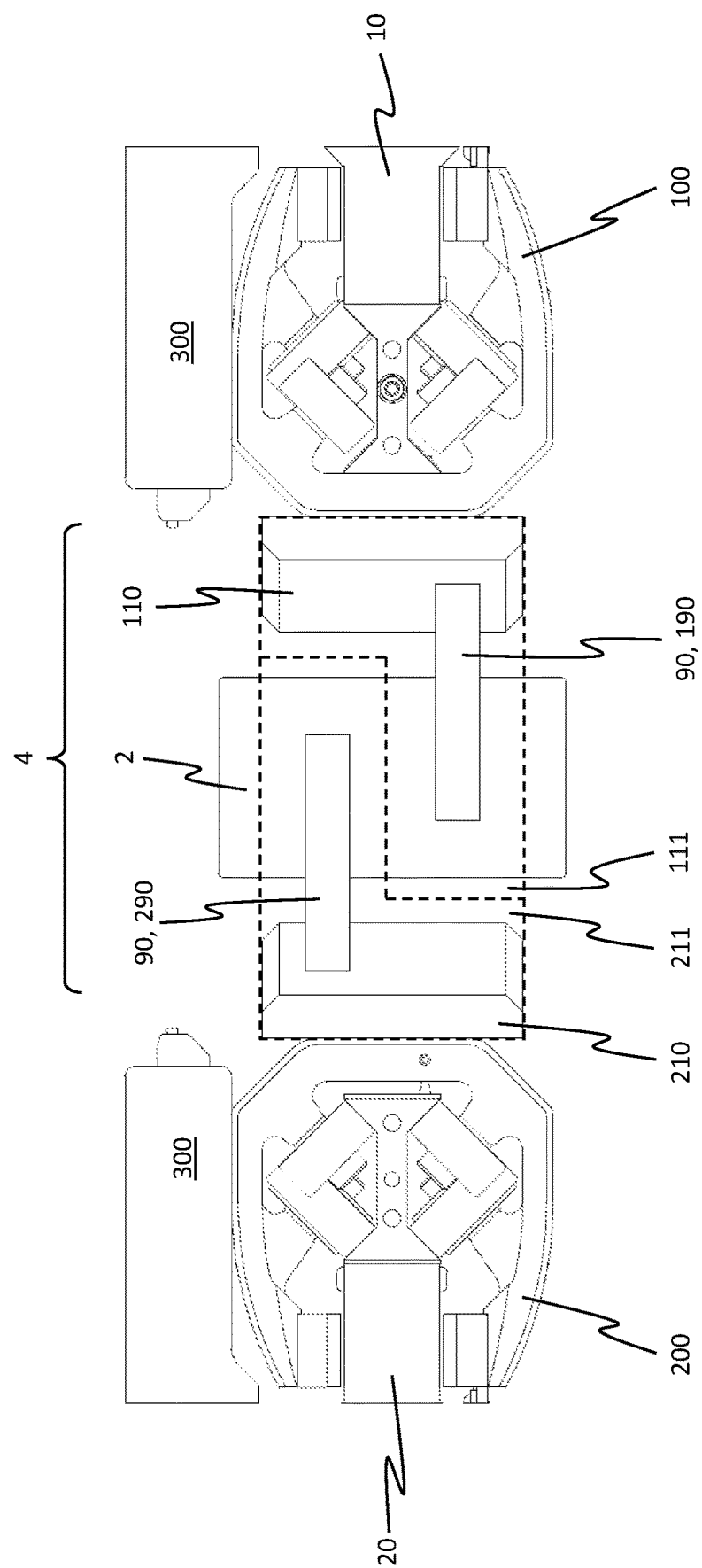
FIG. 18 shows a side view of the further linear transport system of FIG. 17.

FIG. 18 shows a side view of the linear transport system 1 of FIG. 17. The first gripper 190 is arranged in a first partial region 111, the second gripper 290 is arranged in a second partial region 290, the first partial region 111 again being outside the second partial region 211. The first partial region 111 and the second partial region 211 are again shown as dashed lines.

It may be provided that the two grippers 90 are moved with the aid of eccentric 6 and control element 7 analogously to FIGS. 13 to 17. Furthermore, it may be provided that the first retaining element 110 and the second retaining element 210 are embodied to be controllable again and to control the grippers 90, in which case data and power are additionally transmitted to the first rotor 100 and the second rotor 200, respectively, analogously to the methods described above, e.g. with the aid of a power and data transmission module 300 arranged on the first rotor 100 and the second rotor 200, respectively.

It is also possible to combine one of the grippers 90 of FIGS. 17 and 18 with one of the other embodiments of the first retaining element 110 and the second retaining element 210 described above. Overall, this results in a very flexible linear transport system 1.

In addition to the controllable first retaining element 110 and second retaining element 210 shown in FIGS. 17 and 18, other variants may also be provided. For example, the first retaining element 110 and/or the second retaining element 210 may contain a vacuum lifter and a vacuum pump, wherein in this embodiment the vacuum pump or an operation of the vacuum pump may be controlled, wherein for this purpose a transmission of power and data may again be carried out as already described with the aid of a power and data transmission module 300 arranged at the first rotor 100 or at the second rotor 200. The vacuum lifter is then used to form and release the first force-fit and/or form-fit connection or the second force-fit and/or form-fit connection.

In another embodiment, the first retaining element 110 comprises a first electromagnet and/or the second retaining element 210 comprises a second electromagnet. The electromagnets may be arranged similarly to the first magnets 112 in the first retaining elements 110 and to the second magnets 212 in the second retaining elements 210, respectively. The electromagnets are then used to form and release the first force-fit and/or form-fit connection and the second force-fit and/or form-fit connection, respectively. The electromagnets may also be controlled by the transmission of power and data.

Furthermore, it is possible to provide first electromagnets in addition to the first magnets 112 and second electromagnets in addition to the second magnets 212 in the first retaining elements 110 of FIGS. 5 and 6 and the second retaining elements 210 of FIG. 7, respectively. With the aid of the first electromagnets, a magnetic field of the first magnets 112 may then be cancelled. With the aid of the second electromagnets, a magnetic field of the second magnets 212 may be cancelled. In this way, the transfer of the object 2 from such first retaining elements 110 to such second retaining elements 210 may be controlled and the time at which the second force-fit and/or form-fit connection is formed and/or the first force-fit and/or form-fit connection is released may be precisely adjusted.

TABLE 1

List of reference numerals

| | |
|---|---|
| 1 | linear transport system |
| 2 | object |
| 3 | Object section |
| 4 | transfer region |
| 5 | direction of travel |
| 6 | eccentric |
| 7 | control element |
| 10 | first drive unit |
| 11 | first coil unit |
| 12 | first linear motor |
| 13 | first rail |
| 20 | second drive unit |
| 21 | second coil unit |
| 22 | second linear motor |
| 23 | second rail |
| 30 | controller |
| 31 | computing unit |
| 40 | support rail |
| 50 | deflector |
| 90 | gripper |
| 100 | first rotor |
| 101 | first permanent magnet arrangement |
| 102 | first roller |
| 110 | first retaining element |
| 111 | first spatial partial region |
| 112 | first magnet |
| 113 | first fastening hole |
| 114 | first retaining bracket |
| 115 | first fastening plate |
| 120 | first axis of rotation |
| 130 | first circular arc-shaped receptacle |
| 131 | first rubber lip |
| 190 | first gripper |
| 200 | second rotor |
| 201 | second permanent magnet arrangement |
| 202 | second roller |
| 210 | second retaining element |
| 211 | second spatial partial region |
| 212 | second magnet |
| 213 | second fastening hole |
| 214 | second retaining bracket |
| 215 | second fastening plate |
| 230 | second circular arc-shaped receptacle |
| 231 | second rubber lip |
| 290 | second gripper |
| 300 | power and data transmission module |

The invention claimed is:

1. A method for transferring an object from a first rotor to a second rotor in a linear transport system,
   wherein the transfer takes place in a transfer region, wherein the transfer region is arranged between a first drive unit and a second drive unit of the linear transport system,
   wherein the first drive unit comprises a first coil unit of a first linear motor and the second drive unit comprises a second coil unit of a second linear motor,
   wherein the first rotor moves along the first drive unit due to a magnetic field generated by the first coil unit and the second rotor moves along the second drive unit due to a magnetic field generated by the second coil unit, and
   wherein the object is initially fastened to the first rotor via a first force-fit and/or form-fit connection, the method comprising the following steps:
      synchronizing movements of the first rotor and of the second rotor in such a way that the first rotor and the second rotor move in the transfer region with coordinated trajectories;
      forming a second force-fit and/or form-fit connection between the object and the second rotor in the transfer region; and releasing the first force-fit and/or form-fit connection;
wherein the first rotor comprises a first retaining element,
wherein the first force-fit and/or form-fit connection between the first rotor and the object is generated with the aid of the first retaining element, and
wherein the second rotor comprises a second retaining element, wherein the second force-fit and/or form-fit connection between the second rotor and the object is generated with the aid of the second retaining element; and
wherein releasing the first force-fit and/or form-fit connection is carried out by moving the second rotor faster or slower than the first rotor.

2. The method according to claim 1, wherein the first retaining element is arranged in the transfer region in a first spatial partial region and the second retaining element is arranged in the transfer region in a second spatial partial region, wherein the first spatial partial region is outside of the second spatial partial region.

3. The method according to claim 1, wherein the first retaining element comprises at least one first magnet and the second retaining element comprises at least one second magnet, wherein the object comprises, at least in part, a ferromagnetic material.

4. The method according to claim 1, wherein the first retaining element comprises at least one first circular arc-shaped receptacle having a first rubber lip, wherein the second retaining element comprises at least one second circular arc-shaped receptacle having a second rubber lip, wherein the object comprises at least one round object section, wherein the first circular arc-shaped receptacle and the second circular arc-shaped receptacle each comprise an interior angle larger than 180 degrees.

5. The method according to claim 1, wherein the first retaining element and/or the second retaining element is configured to be controllable, wherein power and/or data for controlling the first retaining element and/or the second retaining element is transmitted to the first rotor and the second rotor, respectively.

6. The method according to claim 1, wherein the second retaining element is arranged at least partially behind the object in the transfer region with respect to a direction of travel of the first rotor and/or the second rotor, and wherein the second rotor is moved faster than the first rotor.

7. The method according to claim 1, wherein the second retaining element is arranged in the transfer region at least partially in front of the object with respect to a direction of travel of the first rotor and/or the second rotor, and wherein the second rotor is moved more slowly than the first rotor.

8. The method according to claim 6, wherein the first retaining element is arranged substantially identically to the second retaining element in the transfer region with respect to a direction of travel of the first rotor and/or the second rotor.

9. A controller of a linear transport system configured to carry out a method according to claim 1, the controller comprising:
a computing unit with a computer program executable on the computing unit;
wherein the controller is configured to output control signals to a first drive unit and a second drive unit, and
wherein at least a first rotor and a second rotor are movable by the control signals in such a way that the method is carried out.

10. A linear transport system comprising:
a first rotor and a second rotor, and
a first drive unit and a second drive unit;
wherein a transfer region is arranged between the first drive unit and the second drive unit,
wherein the first drive unit comprises a first coil unit of a first linear motor and the second drive unit comprises a second coil unit of a second linear motor,
wherein the first rotor is movable along the first drive unit due to a magnetic field generated by the first coil unit and the second rotor is movable along the second drive unit due to a magnetic field generated by the second coil unit,
wherein an object is fastenable to a first retaining element of the first rotor by a first force-fit and/or form-fit connection, wherein the object is fastenable to a second retaining element of the second rotor by a second force-fit and/or form-fit connection, and
wherein the linear transport system further comprises a controller, wherein the controller is configured to synchronize movements of the first rotor and the second rotor such that:
the first rotor and the second rotor move in the transfer region with coordinated trajectories,
the first rotor and/or the second rotor are moved in such a way that a second force-fit and/or form-fit connection is formed between the object and the second rotor in the transfer region, and
the first rotor and/or the second rotor are moved in such a way that the first force-fit and/or form-fit connection is released;
wherein the first retaining element comprises at least one first circular arc-shaped receptacle having a first rubber lip, wherein the second retaining element comprises at least one second circular arc-shaped receptacle having a second rubber lip, wherein the object comprises at least one round object portion, wherein the first circular arc-shaped receptacle and the second circular arc-shaped receptacle each comprise an interior angle larger than 180 degrees.

11. A method for transferring an object from a first rotor to a second rotor in a linear transport system,
wherein the transfer takes place in a transfer region, wherein the transfer region is arranged between a first drive unit and a second drive unit of the linear transport system,
wherein the first drive unit comprises a first coil unit of a first linear motor and the second drive unit comprises a second coil unit of a second linear motor,
wherein the first rotor moves along the first drive unit due to a magnetic field generated by the first coil unit and the second rotor moves along the second drive unit due to a magnetic field generated by the second coil unit, and
wherein the object is initially fastened to the first rotor via a first force-fit and/or form-fit connection, the method comprising the following steps:
synchronizing movements of the first rotor and of the second rotor in such a way that the first rotor and the second rotor move in the transfer region with coordinated trajectories;
forming a second force-fit and/or form-fit connection between the object and the second rotor in the transfer region; and
releasing the first force-fit and/or form-fit connection;
wherein the first rotor comprises a first retaining element,
wherein the first force-fit and/or form-fit connection between the first rotor and the object is generated with the aid of the first retaining element, and wherein the second rotor comprises a second retaining element, wherein the second force-fit and/or form-fit connection between the second rotor and the object is generated with the aid of the second retaining element; and wherein the first retaining element and/or the second retaining element is at least partially moved with respect to a direction of travel of the first rotor and/or the second rotor in front of and/or behind and/or in the transfer region with the aid of an eccentric and a control element acting on the eccentric and fixed to the first drive unit or the second drive unit.

12. The method according to claim 11, wherein the first retaining element and/or the second retaining element comprises a gripper, wherein the gripper is moved with the aid of the eccentric and the control element acting on the eccentric.

13. A linear transport system comprising:
a first rotor and a second rotor, and
a first drive unit and a second drive unit;
wherein a transfer region is arranged between the first drive unit and the second drive unit,
wherein the first drive unit comprises a first coil unit of a first linear motor and the second drive unit comprises a second coil unit of a second linear motor,
wherein the first rotor is movable along the first drive unit due to a magnetic field generated by the first coil unit and the second rotor is movable along the second drive unit due to a magnetic field generated by the second coil unit,
wherein an object is fastenable to a first retaining element of the first rotor by a first force-fit and/or form-fit connection, wherein the object is fastenable to a second retaining element of the second rotor by a second force-fit and/or form-fit connection, and
wherein the linear transport system further comprises a controller, wherein the controller is configured to synchronize movements of the first rotor and the second rotor such that:
the first rotor and the second rotor move in the transfer region with coordinated trajectories,
the first rotor and/or the second rotor are moved in such a way that a second force-fit and/or form-fit connection is formed between the object and the second rotor in the transfer region, and
the first rotor and/or the second rotor are moved in such a way that the first force-fit and/or form-fit connection is released;
wherein the first retaining element comprises at least one first magnet and the second retaining element comprises at least one second magnet, wherein the object comprises, at least in part, a ferromagnetic material.

14. The linear transport system according to claim 13, wherein the first retaining element is arranged in the transfer region in a first spatial partial region and the second retaining element is arranged in the transfer region in a second spatial partial region, wherein the first spatial partial region is outside the second spatial partial region.

15. A linear transport system comprising:
a first rotor and a second rotor, and
a first drive unit and a second drive unit;
wherein a transfer region is arranged between the first drive unit and the second drive unit,
wherein the first drive unit comprises a first coil unit of a first linear motor and the second drive unit comprises a second coil unit of a second linear motor,
wherein the first rotor is movable along the first drive unit due to a magnetic field generated by the first coil unit and the second rotor is movable along the second drive unit due to a magnetic field generated by the second coil unit,
wherein an object is fastenable to a first retaining element of the first rotor by a first force-fit and/or form-fit connection, wherein the object is fastenable to a second retaining element of the second rotor by a second force-fit and/or form-fit connection, and
wherein the linear transport system further comprises a controller, wherein the controller is configured to synchronize movements of the first rotor and the second rotor such that:
the first rotor and the second rotor move in the transfer region with coordinated trajectories,
the first rotor and/or the second rotor are moved in such a way that a second force-fit and/or form-fit connection is formed between the object and the second rotor in the transfer region, and
the first rotor and/or the second rotor are moved in such a way that the first force-fit and/or form-fit connection is released;
wherein the second retaining element is arranged in the transfer region at least partially in front of the object with respect to a direction of travel of the first rotor and/or of the second rotor, and wherein the second rotor is moveable more slowly than the first rotor.

16. A method for transferring an object from a first rotor to a second rotor in a linear transport system,
wherein the transfer takes place in a transfer region, wherein the transfer region is arranged between a first drive unit and a second drive unit of the linear transport system,
wherein the first drive unit comprises a first coil unit of a first linear motor and the second drive unit comprises a second coil unit of a second linear motor,
wherein the first rotor moves along the first drive unit due to a magnetic field generated by the first coil unit and the second rotor moves along the second drive unit due to a magnetic field generated by the second coil unit, and
wherein the object is initially fastened to the first rotor via a first force-fit and/or form-fit connection, the method comprising the following steps:
synchronizing movements of the first rotor and of the second rotor in such a way that the first rotor and the second rotor move in the transfer region with coordinated trajectories;
forming a second force-fit and/or form-fit connection between the object and the second rotor in the transfer region;
releasing the first force-fit and/or form-fit connection;
wherein the first rotor comprises a first retaining element,
wherein the first force-fit and/or form-fit connection between the first rotor and the object is generated with the aid of the first retaining element, and
wherein the second rotor comprises a second retaining element, wherein the second force-fit and/or form-fit connection between the second rotor and the object is generated with the aid of the second retaining element;
wherein the first retaining element comprises at least one first magnet and the second retaining element comprises at least one second magnet,
wherein the object comprises, at least in part, a ferromagnetic material, and
wherein at least part of the first force-fit and/or form-fit connection is configured as a force-fit connection between the first magnet and the ferromagnetic material of the object, while at least part of the second force-fit and/or form-fit connection is configured as a force-fit connection between the second magnet and the ferromagnetic material of the object, wherein releasing the first force-fit and/or form-fit connection is carried out by moving the second rotor faster or slower than the first rotor.

17. A linear transport system comprising:
a first rotor and a second rotor, and
a first drive unit and a second drive unit;
wherein a transfer region is arranged between the first drive unit and the second drive unit,
wherein the first drive unit comprises a first coil unit of a first linear motor and the second drive unit comprises a second coil unit of a second linear motor,
wherein the first rotor is movable along the first drive unit due to a magnetic field generated by the first coil unit and the second rotor is movable along the second drive unit due to a magnetic field generated by the second coil unit,
wherein an object is fastenable to a first retaining element of the first rotor by a first force-fit and/or form-fit connection, wherein the object is fastenable to a second retaining element of the second rotor by a second force-fit and/or form-fit connection, and
wherein the linear transport system further comprises a controller, wherein the controller is configured to synchronize movements of the first rotor and the second rotor such that:
the first rotor and the second rotor move in the transfer region with coordinated trajectories,
the first rotor and/or the second rotor are moved in such a way that a second force-fit and/or form-fit connection is formed between the object and the second rotor in the transfer region, and
the first rotor and/or the second rotor are moved in such a way that the first force-fit and/or form-fit connection is released;
wherein the second retaining element is arranged at least partially behind the object in the transfer region with respect to a direction of travel of the first rotor and/or of the second rotor, and wherein the second rotor is movable faster than the first rotor.

18. The linear transport system according to claim 17, wherein the first retaining element is arranged identically to the second retaining element in the transfer region with respect to a direction of travel of the first rotor and/or the second rotor.

* * * * *